US012634921B2

(12) United States Patent
Park et al.

(10) Patent No.: US 12,634,921 B2
(45) Date of Patent: May 19, 2026

(54) METHOD AND APPARATUS FOR OPERATING SL DRX TIMER ON BASIS OF GROUPCAST DESTINATION L2 ID IN NR V2X

(71) Applicant: LG ELECTRONICS INC., Seoul (KR)

(72) Inventors: Giwon Park, Seoul (KR); Seungmin Lee, Seoul (KR); Seoyoung Back, Seoul (KR); Jongwoo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 335 days.

(21) Appl. No.: 18/569,433

(22) PCT Filed: Jun. 16, 2022

(86) PCT No.: PCT/KR2022/008519
§ 371 (c)(1),
(2) Date: Dec. 12, 2023

(87) PCT Pub. No.: WO2022/265419
PCT Pub. Date: Dec. 22, 2022

(65) Prior Publication Data
US 2024/0284439 A1     Aug. 22, 2024

(30) Foreign Application Priority Data

Jun. 18, 2021     (KR) ........................ 10-2021-0079140

(51) Int. Cl.
*H04W 72/121*     (2023.01)
*H04W 72/25*     (2023.01)
(Continued)

(52) U.S. Cl.
CPC ......... *H04W 72/121* (2013.01); *H04W 72/25* (2023.01); *H04W 72/543* (2023.01); *H04W 92/18* (2013.01)

(58) Field of Classification Search
CPC . H04W 72/121; H04W 72/25; H04W 72/543; H04W 92/18; H04W 76/14;
(Continued)

(56) References Cited

U.S. PATENT DOCUMENTS 11,197,134 B2 * 12/2021 Lee ........................ H04W 72/30
12,048,052 B2 *  7/2024 Park ........................ H04W 4/40
(Continued)

FOREIGN PATENT DOCUMENTS

| KR | 10-2021-0016278 | 2/2021 |
| KR | 10-2021-0018773 | 2/2021 |
| WO | 2021-119474 | 6/2021 |

OTHER PUBLICATIONS

Vivo, "SL DRX for Groupcast and Broadcast," 3GPP TSG-RAN WG2 Meeting #113bis electronic, R2-2102817, Apr. 2021, 7 pages (Year: 2021).*
(Continued)

*Primary Examiner* — Ivan O Latorre
(74) *Attorney, Agent, or Firm* — LEE, HONG, DEGERMAN, KANG & WAIMEY

(57) ABSTRACT

Proposed is a method for operation of a first device (100) in a wireless communication system. The method may comprise the steps of: initiating a timer for an active time on the basis of reception of first SCI; transmitting, on the basis of the timer for the active time being operating, second SCI for scheduling of a second PSSCH to at least one device within a group via a second PSCCH; and transmitting, on the basis of the timer for the active time being operating, a second
(Continued)

obtaining an SL DRX configuration including information related to a timer for active time, based on a first destination L2 ID — S910 receiving, from a second device in a group where groupcast communication is performed, first SCI for scheduling of a first PSSCH through a first PSCCH, based on an active time of an SL DRX configuration — S920 receiving, from a second device, a first MAC PDU related to a first destination L2 ID and second SCI through a first PSSCH, based on an active time — S930 starting a timer for active time, based on a reception of second SCI — S940 transmitting, to at least one device in a group, third SCI for scheduling of a second PSSCH through a second PSCCH, based on a timer for active time being running — S950 transmitting, to at least one device, a second MAC PDU related to a second destination L2 ID through a second PSSCH, based on a timer for active time being running — S960

MAC PDU related to a second destination L2 ID to the at least one device via the second PSSCH.

15 Claims, 14 Drawing Sheets

(51) Int. Cl.
$$H04W\ 72/543 \qquad (2023.01)$$
$$H04W\ 92/18 \qquad (2009.01)$$

(58) Field of Classification Search
CPC ..... H04W 92/10; H04W 72/12; H04W 76/11; H04W 4/06; H04W 4/40; H04W 4/46; H04W 52/02; H04W 52/0216; H04W 76/28

See application file for complete search history.

(56) References Cited

U.S. PATENT DOCUMENTS

| | | | | |
|---|---|---|---|---|
| 12,048,053 | B2 * | 7/2024 | Mohammad Soleymani | H04W 74/0808 |
| 12,219,649 | B2 * | 2/2025 | Back | H04W 52/28 |
| 2021/0227465 | A1 * | 7/2021 | Kung | H04W 76/28 |
| 2021/0400762 | A1 * | 12/2021 | Jeong | H04W 76/28 |
| 2022/0022279 | A1 * | 1/2022 | Kim | H04W 72/23 |
| 2022/0030661 | A1 * | 1/2022 | Jeong | H04W 72/20 |
| 2022/0191794 | A1 * | 6/2022 | Pan | H04W 28/24 |
| 2022/0191795 | A1 * | 6/2022 | Pan | H04W 52/0219 |
| 2022/0225469 | A1 * | 7/2022 | Lee | H04L 1/1812 |
| 2022/0264586 | A1 * | 8/2022 | Qi | H04L 1/1812 |
| 2022/0353815 | A1 * | 11/2022 | Lin | H04W 52/0232 |
| 2022/0361049 | A1 * | 11/2022 | Zhang | H04L 1/1851 |
| 2023/0063453 | A1 * | 3/2023 | Back | H04L 5/00 |
| 2023/0066041 | A1 * | 3/2023 | Guo | H04W 52/0216 |
| 2023/0098631 | A1 * | 3/2023 | Lee | H04W 72/56 370/329 |
| 2023/0117475 | A1 * | 4/2023 | Wang | H04W 76/28 370/311 |
| 2023/0180342 | A1 * | 6/2023 | Shin | H04L 1/1854 370/329 |
| 2023/0217463 | A1 * | 7/2023 | Hui | H04W 72/25 370/329 |
| 2023/0217536 | A1 * | 7/2023 | Sun | H04W 76/28 370/328 |
| 2023/0232492 | A1 * | 7/2023 | Han | H04W 72/0446 370/329 |
| 2023/0239793 | A1 * | 7/2023 | Lin | H04W 52/028 370/311 |
| 2023/0247519 | A1 * | 8/2023 | Hong | H04W 76/38 370/315 |
| 2023/0262601 | A1 * | 8/2023 | Ganesan | H04W 28/0268 370/311 |
| 2023/0300857 | A1 * | 9/2023 | Deng | H04W 72/11 370/329 |
| 2023/0309016 | A1 * | 9/2023 | Li | H04W 76/14 |
| 2023/0337318 | A1 * | 10/2023 | Ko | H04W 76/28 |
| 2023/0389045 | A1 * | 11/2023 | Ko | H04W 72/25 |
| 2023/0413377 | A1 * | 12/2023 | Park | H04L 1/1854 |
| 2024/0032143 | A1 * | 1/2024 | Zheng | H04W 72/25 |
| 2024/0064849 | A1 * | 2/2024 | Mohammad Soleymani | H04W 76/28 |
| 2024/0080768 | A1 * | 3/2024 | Ji | H04W 72/02 |
| 2024/0251436 | A1 * | 7/2024 | Ko | H04W 72/56 |
| 2024/0275528 | A1 * | 8/2024 | Park | H04W 4/08 |
| 2024/0284439 | A1 * | 8/2024 | Park | H04W 4/40 |
| 2024/0349313 | A1 * | 10/2024 | Park | H04W 28/0268 |
| 2024/0365231 | A1 * | 10/2024 | Park | H04L 1/1854 |
| 2025/0024367 | A1 * | 1/2025 | Park | H04W 72/25 |

OTHER PUBLICATIONS

Lenovo et al., "DRX Configuration for Broadcast and Groupcast SL communication," 3GPP TSG-RAN WG2 Meeting #113bis electronic, R2-2103741, Apr. 2021, 5 page (Year: 2021).*

PCT International Application No. PCT/KR2022/008519, International Search Report dated Oct. 13, 2022, 3 pages.

QUALCOMM Incorporated, "Discussion on SL DRX Timers and Others," R2-2105906, 3GPP TSG RAN WG2 Meeting #114-e, E-meeting, May 2021, 8 pages.

ZTE Corporation et al., "Discussion on SL DRX configuration," R2-2105077, 3GPP TSG-RAN WG2 Meeting #114 electronic, Online, May 2021, 9 pages.

European Patent Office Application Serial No. 22825342.3, Search Report dated May 13, 2025, 13 pages.

LG (Rapporteur), "Summary of email discussion [702][SLe] High-level principles for SL DRX (LG)," R2-2101727, 3GPP TSG-RAN WG2 #113-e, E-meeting, Jan. 2021, 85 pages.

Sharp, "Discussion on SL DRX inactivity timer," R2-2105278, 3GPP TSG-RAN WG2 Meeting #114 electronic, Online, May 2021, 2 pages.

Huawei et al., "Discussion on RAN2 LS on DRX impact," R1-2103752, 3GPP TSG RAN WG1 Meeting #104bis-e, E-meeting, Apr. 2021, 3 pages.

Interdigital Inc., "Performing Mode 2 Resource Allocation when configured with SL DRX," R2-2100516, 3GPP RAN WG2 Meeting #113 electronic, Online, Jan. 2021, 3 pages.

* cited by examiner

Resource grid

1RB=12 subcarriers

A BWP

A carrier
(up to 3300 subcarriers,
i.e., 275 RBs)

1 RE

1subcarrier 1 symbol k=0 l=0 ...

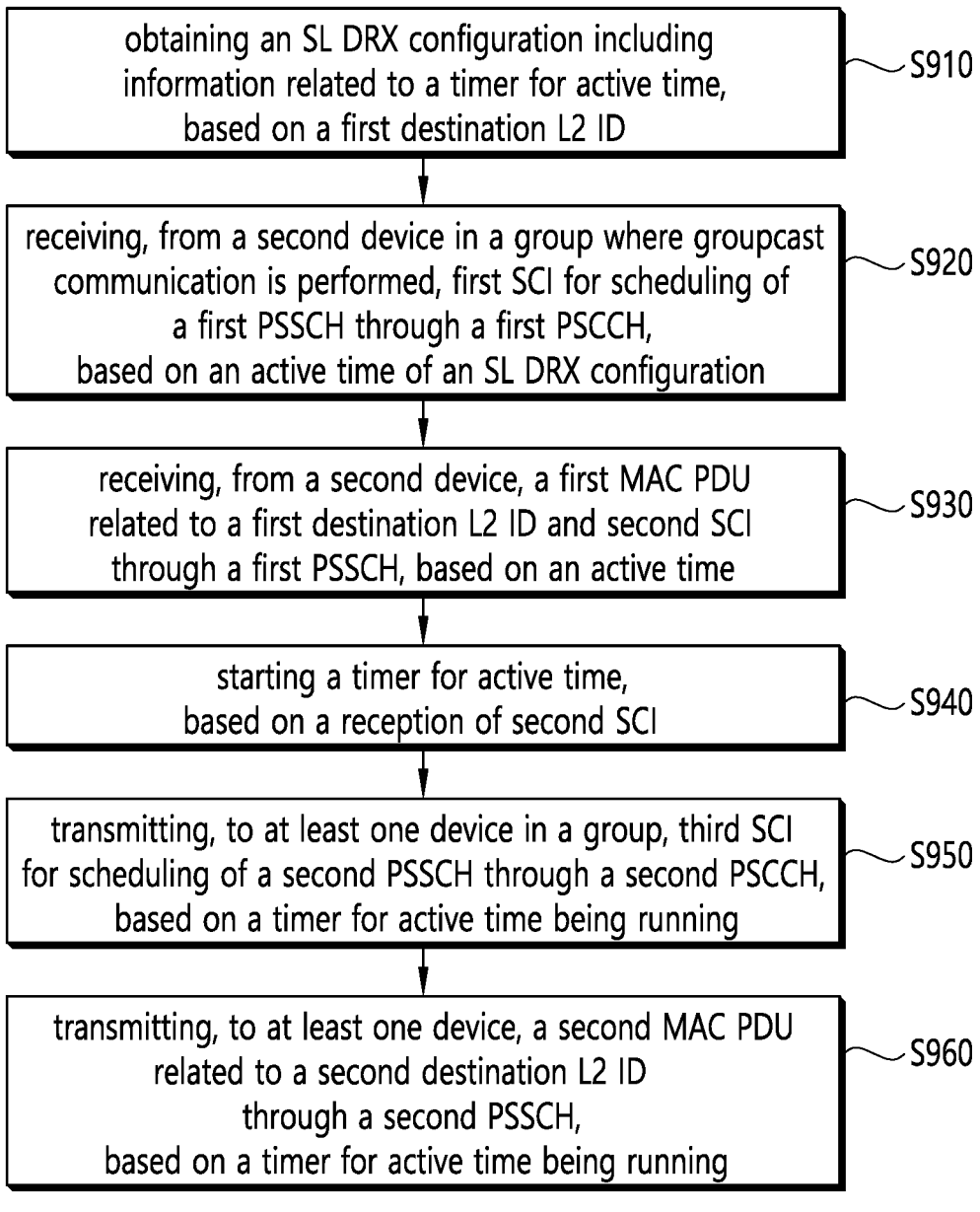

obtaining an SL DRX configuration including
information related to a timer for active time,
based on a first destination L2 ID          S910 receiving, from a second device in a group where groupcast
communication is performed, first SCI for scheduling of
a first PSSCH through a first PSCCH,
based on an active time of an SL DRX configuration          S920 receiving, from a second device, a first MAC PDU
related to a first destination L2 ID and second SCI
through a first PSSCH, based on an active time          S930 starting a timer for active time,
based on a reception of second SCI          S940 transmitting, to at least one device in a group, third SCI
for scheduling of a second PSSCH through a second PSCCH,
based on a timer for active time being running          S950 transmitting, to at least one device, a second MAC PDU
related to a second destination L2 ID
through a second PSSCH,
based on a timer for active time being running          S960

FIG. 10

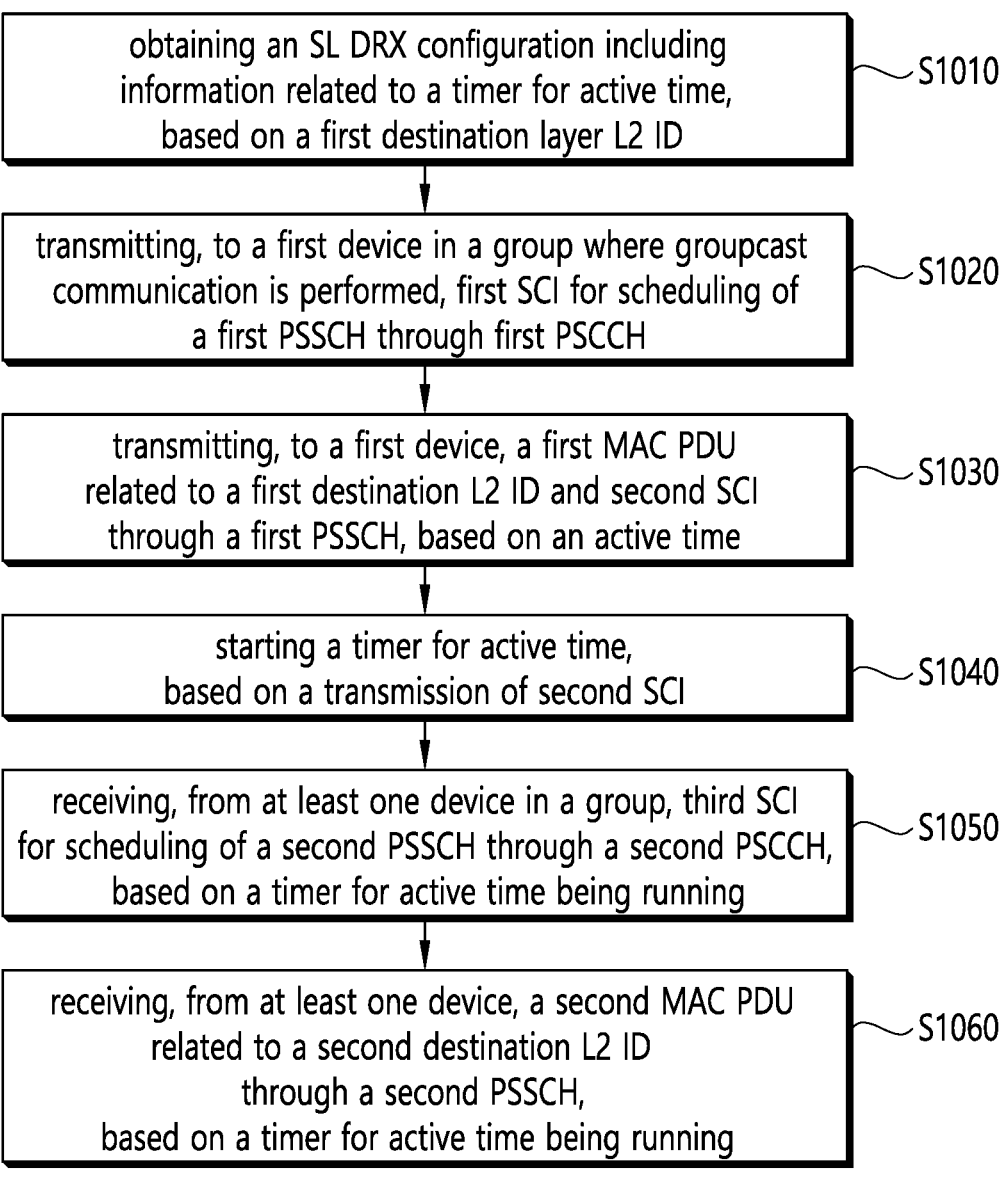

obtaining an SL DRX configuration including
information related to a timer for active time,
based on a first destination layer L2 ID — S1010 transmitting, to a first device in a group where groupcast
communication is performed, first SCI for scheduling of
a first PSSCH through first PSCCH — S1020 transmitting, to a first device, a first MAC PDU
related to a first destination L2 ID and second SCI
through a first PSSCH, based on an active time — S1030 starting a timer for active time,
based on a transmission of second SCI — S1040 receiving, from at least one device in a group, third SCI
for scheduling of a second PSSCH through a second PSCCH,
based on a timer for active time being running — S1050 receiving, from at least one device, a second MAC PDU
related to a second destination L2 ID
through a second PSSCH,
based on a timer for active time being running — S1060

1000(102/106, 202/206)

Device (100,200)

FIG. 16

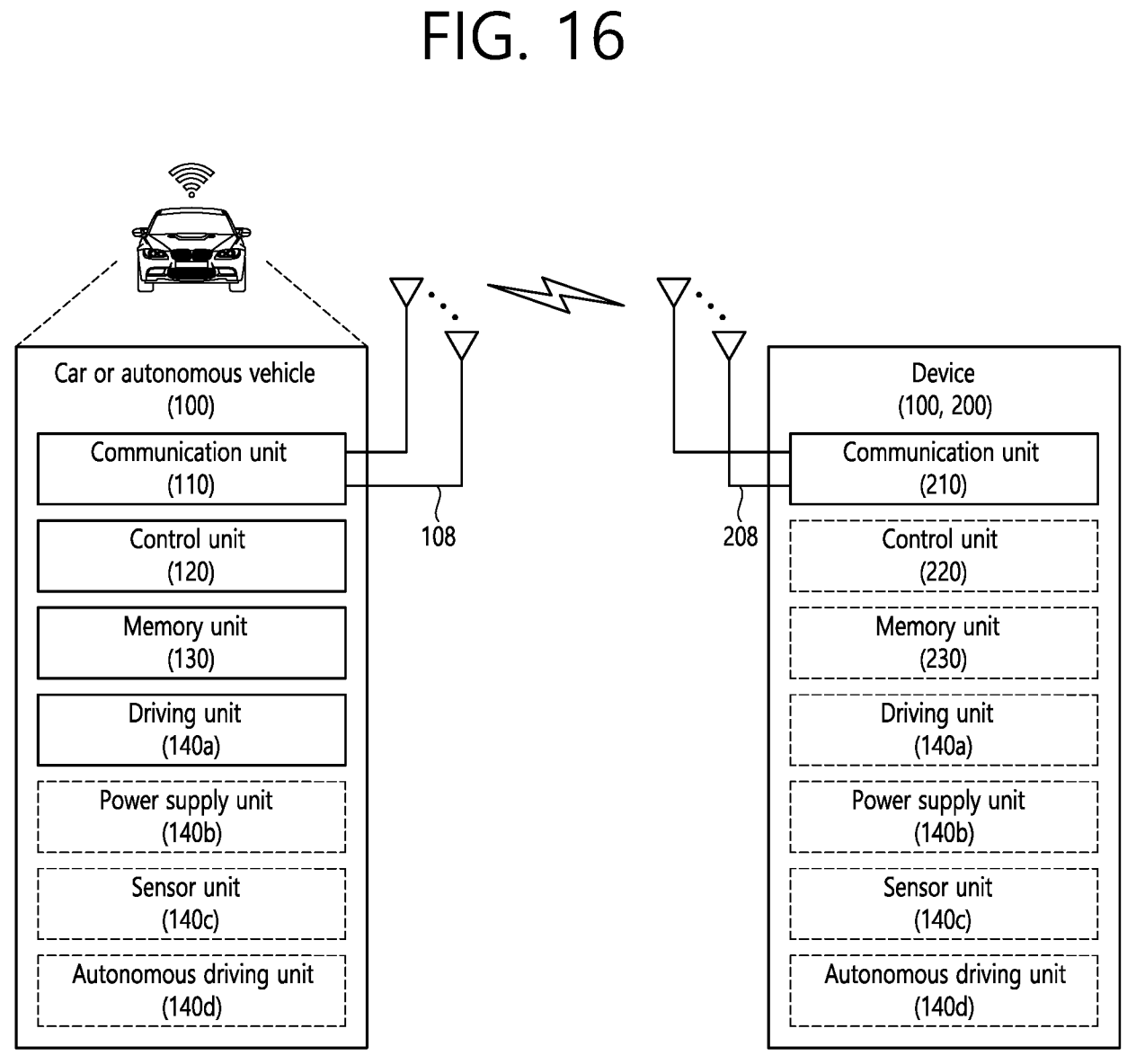

Car or autonomous vehicle
(100)

Communication unit
(110)

Control unit
(120)

Memory unit
(130)

Driving unit
(140a)

Power supply unit
(140b)

Sensor unit
(140c)

Autonomous driving unit
(140d)

108

Device
(100, 200)

Communication unit
(210)

Control unit
(220)

Memory unit
(230)

Driving unit
(140a)

Power supply unit
(140b)

Sensor unit
(140c)

Autonomous driving unit
(140d)

208

METHOD AND APPARATUS FOR OPERATING SL DRX TIMER ON BASIS OF GROUPCAST DESTINATION L2 ID IN NR V2X

CROSS-REFERENCE TO RELATED APPLICATIONS

This application is the National Stage filing under 35 U.S.C. 371 of International Application No. PCT/KR2022/008519, filed on Jun. 16, 2022, which claims the benefit of earlier filing date and right of priority to Korean Application No. 10-2021-0079140, filed on Jun. 18, 2021, the contents of which are all hereby incorporated by reference herein in their entireties.

TECHNICAL FIELD

This disclosure relates to a wireless communication system.

BACKGROUND

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication apparatuses require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

SUMMARY

According to an embodiment of the present disclosure, a method for performing, by a first device, wireless communication may be proposed. For example, the method may comprise: obtaining a sidelink (SL) discontinuous reception (DRX) configuration including information related to a timer for active time, based on a first destination layer (L) 2 ID; receiving, from a second device in a group where groupcast communication is performed, first SCI for scheduling of a first physical sidelink shared channel (PSSCH) through a first physical sidelink control channel (PSCCH), based on an active time of the SL DRX configuration; receiving, from the second device, a first medium access control (MAC) protocol data unit (PDU) related to the first destination L2 ID and second SCI through the first PSSCH, based on the active time; starting the timer for active time, based on the reception of the second SCI; transmitting, to at least one device in a group, third SCI for scheduling of a second PSSCH through a second PSCCH, based on the timer for active time being running; and transmitting, to the at least one device, a second MAC PDU related to a second destination L2 ID through the second PSSCH, based on the timer for active time being running, wherein the active time may include a time interval during which the timer for active time is running.

According to an embodiment of the present disclosure, a first device for performing wireless communication may be performed. For example, the first device may comprise: one or more memories storing instructions; one or more transceivers; and one or more processors connected to the one or more memories and the one or more transceivers. For example, the one or more processors may execute the instructions to: obtain a sidelink (SL) discontinuous reception (DRX) configuration including information related to a timer for active time, based on a first destination layer (L) 2 ID; receive, from a second device in a group where groupcast communication is performed, first SCI for scheduling of a first physical sidelink shared channel (PSSCH) through a first physical sidelink control channel (PSCCH), based on an active time of the SL DRX configuration; receive, from the second device, a first medium access control (MAC) protocol data unit (PDU) related to the first destination L2 ID and second SCI through the first PSSCH, based on the active time; start the timer for active time, based on the reception of the second SCI; transmit, to at least one device in a group, third SCI for scheduling of a second PSSCH through a second PSCCH, based on the timer for active time being running; and transmit, to the at least one device, a second MAC PDU related to a second destination L2 ID through the second PSSCH, based on the timer for active time being running, wherein the active time may include a time interval during which the timer for active time is running.

According to an embodiment of the present disclosure, a device adapted to control a first user equipment (UE) may be proposed. For example, the device may comprise: one or more processors; and one or more memories operably connectable to the one or more processors and storing instructions. For example, the one or more processors may execute the instructions to: obtain a sidelink (SL) discontinuous reception (DRX) configuration including information related to a timer for active time, based on a first destination layer (L) 2 ID; receive, from a second UE in a group where groupcast communication is performed, first SCI for scheduling of a first physical sidelink shared channel (PSSCH) through a first physical sidelink control channel (PSCCH), based on an active time of the SL DRX configuration; receive, from the second UE, a first medium access control (MAC) protocol data unit (PDU) related to the first destination L2 ID and second SCI through the first PSSCH, based on the active time; start the timer for active time, based on the reception of the second SCI; transmit, to at least one UE in a group, third SCI for scheduling of a second PSSCH through a second PSCCH, based on the timer for active time being running; and transmit, to the at least one UE, a second MAC PDU related to a second destination L2 ID through the second PSSCH, based on the timer for active time being running, wherein the active time may include a time interval during which the timer for active time is running.

According to an embodiment of the present disclosure, a non-transitory computer-readable storage medium storing instructions may be proposed. For example, the instructions, when executed, may cause a first device to: obtain a sidelink (SL) discontinuous reception (DRX) configuration including information related to a timer for active time, based on a first destination layer (L) 2 ID; receive, from a second device in a group where groupcast communication is performed, first SCI for scheduling of a first physical sidelink shared channel (PSSCH) through a first physical sidelink control channel (PSCCH), based on an active time of the SL DRX configuration; receive, from the second device, a first medium access control (MAC) protocol data unit (PDU) related to the first destination L2 ID and second SCI through the first PSSCH, based on the active time; start the timer for active time, based on the reception of the second SCI; transmit, to at least one device in a group, third SCI for scheduling of a second PSSCH through a second PSCCH, based on the timer for active time being running; and transmit, to the at least one device, a second MAC PDU related to a second destination L2 ID through the second PSSCH, based on the timer for active time being running, wherein the active time may include a time interval during which the timer for active time is running.

According to an embodiment of the present disclosure, a method for performing, by a second device, wireless communication may be proposed. For example, the method may comprise: obtaining a sidelink (SL) discontinuous reception (DRX) configuration including information related to a timer for active time, based on a first destination layer (L) 2 ID; transmitting, to a first device in a group where groupcast communication is performed, first SCI for scheduling of a first physical sidelink shared channel (PSSCH) through first physical sidelink control channel (PSCCH); transmitting, to the first device, a first medium access control (MAC) protocol data unit (PDU) related to the first destination L2 ID and second SCI through the first PSSCH, based on the active time; starting the timer for active time, based on the transmission of the second SCI; receiving, from at least one device in a group, third SCI for scheduling of a second PSSCH through a second PSCCH, based on the timer for active time being running; and receiving, from the at least one device, a second MAC PDU related to a second destination L2 ID through the second PSSCH, based on the timer for active time being running, wherein the active time may include a time interval during which the timer for active time is running.

According to an embodiment of the present disclosure, a second device for performing wireless communication may be proposed. For example, the second device may comprise: one or more memories storing instructions; one or more transceivers; and one or more processors connected to the one or more memories and the one or more transceivers. For example, the one or more processors may execute the instructions to: obtain a sidelink (SL) discontinuous reception (DRX) configuration including information related to a timer for active time, based on a first destination layer (L) 2 ID; transmit, to a first device in a group where groupcast communication is performed, first SCI for scheduling of a first physical sidelink shared channel (PSSCH) through first physical sidelink control channel (PSCCH); transmit, to the first device, a first medium access control (MAC) protocol data unit (PDU) related to the first destination L2 ID and second SCI through the first PSSCH, based on the active time; start the timer for active time, based on the transmission of the second SCI; receive, from at least one device in a group, third SCI for scheduling of a second PSSCH through a second PSCCH, based on the timer for active time being running; and receive, from the at least one device, a second MAC PDU related to a second destination L2 ID through the second PSSCH, based on the timer for active time being running, wherein the active time may include a time interval during which the timer for active time is running.

A UE can efficiently perform sidelink communication.

BRIEF DESCRIPTION OF THE DRAWINGS

FIG. 2 shows a radio protocol architecture, based on an embodiment of the present disclosure.

FIG. 4 shows a structure of a slot of an NR frame, based on an embodiment of the present disclosure.

FIG. 9 shows a procedure for a first device to perform wireless communication, according to one embodiment of the present disclosure.

FIG. 10 shows a procedure for a second device to perform wireless communication, according to one embodiment of the present disclosure.

FIG. 16 shows a vehicle or an autonomous vehicle, based on an embodiment of the present disclosure.

DETAILED DESCRIPTION

Figure 1:
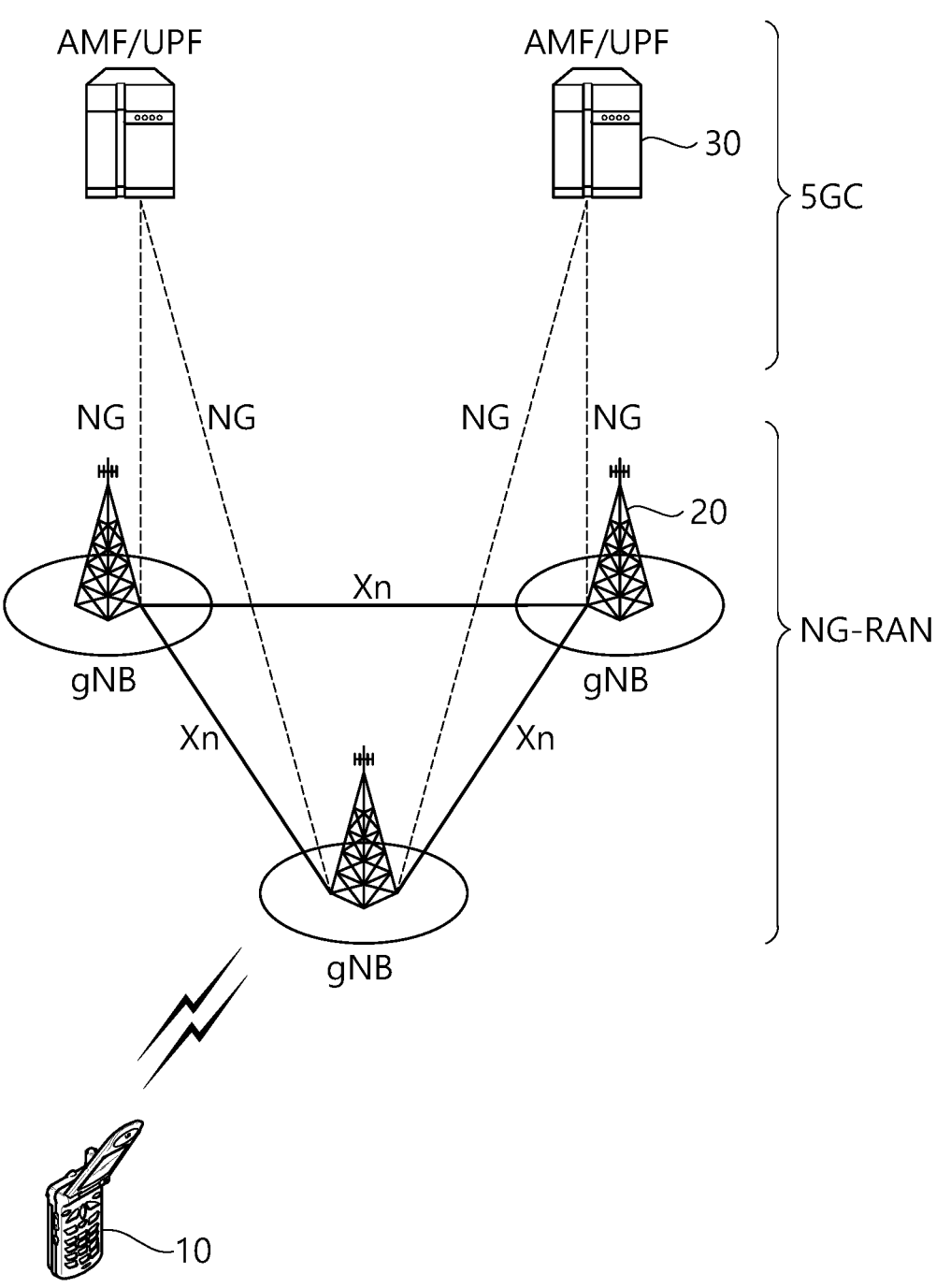
FIG. 1 shows a structure of an NR system, based on an embodiment of the present disclosure.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

In the following description, 'when, if, or in case of' may be replaced with 'based on'.

A technical feature described individually in one figure in the present disclosure may be individually implemented, or may be simultaneously implemented.

In the present disclosure, a higher layer parameter may be a parameter which is configured, pre-configured or pre-defined for a UE. For example, a base station or a network may transmit the higher layer parameter to the UE. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

For terms and techniques used herein that are not specifically described, reference may be made to wireless communication standards documents published prior to the filing of this specification.

FIG. 1 shows a structure of an NR system, based on an embodiment of the present disclosure. The embodiment of FIG. 1 may be combined with various embodiments of the present disclosure.

Referring to FIG. 1, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 1 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
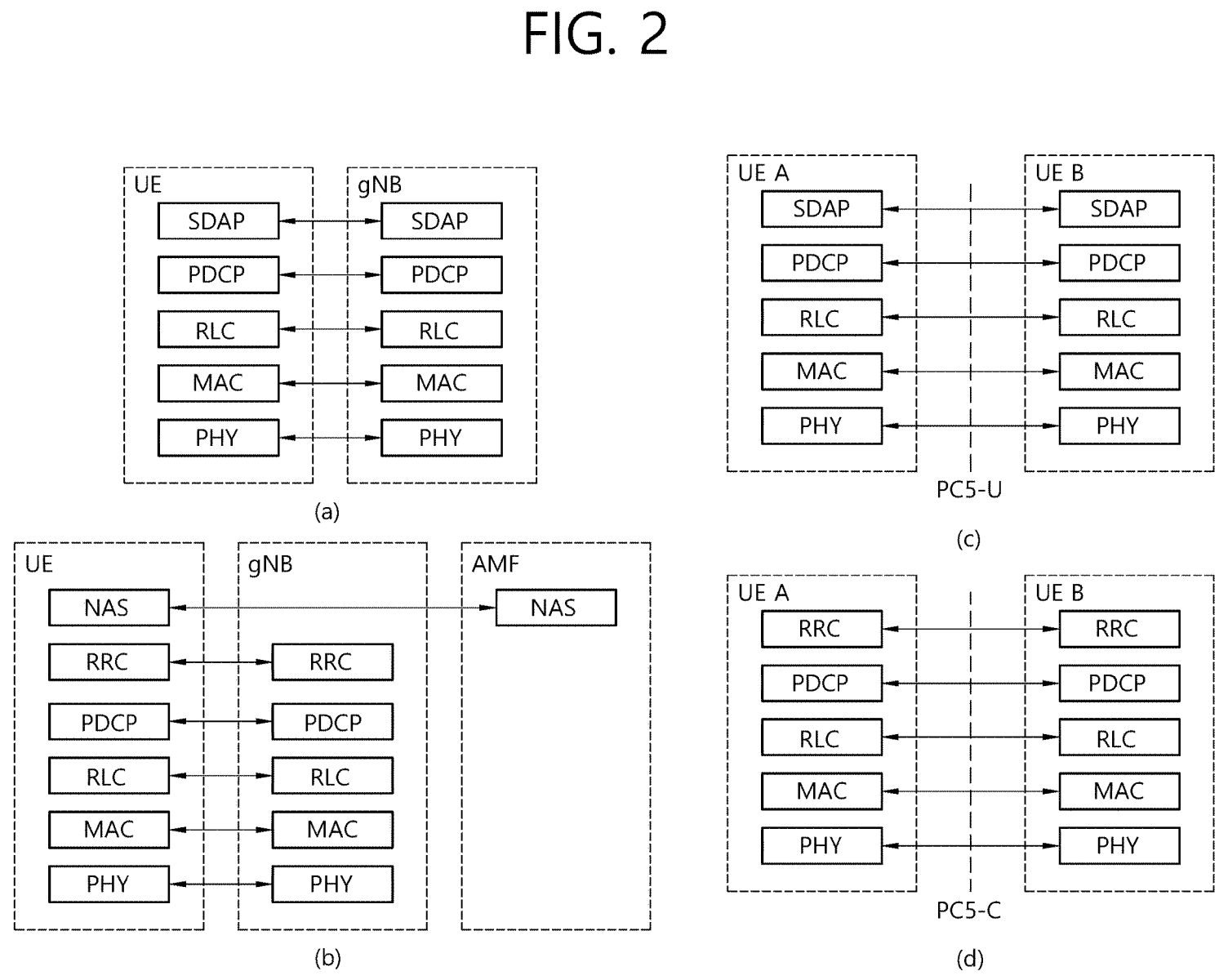

FIG. 2 shows a radio protocol architecture, based on an embodiment of the present disclosure. The embodiment of FIG. 2 may be combined with various embodiments of the present disclosure. Specifically, (a) of FIG. 2 shows a radio protocol stack of a user plane for Uu communication, and (b) of FIG. 2 shows a radio protocol stack of a control plane for Uu communication. (c) of FIG. 2 shows a radio protocol stack of a user plane for SL communication, and (d) of FIG. 2 shows a radio protocol stack of a control plane for SL communication.

Referring to FIG. 2, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 3:
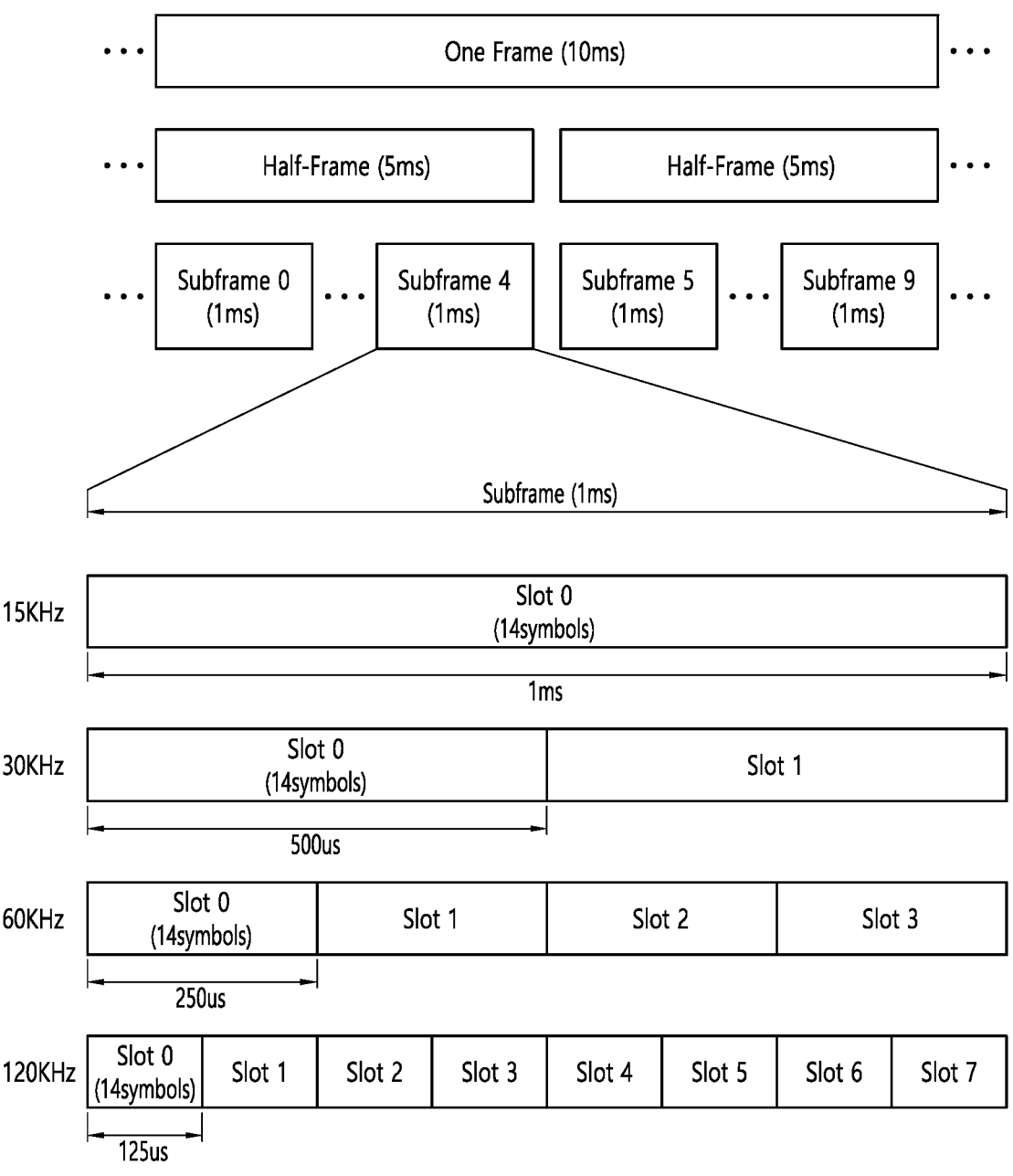
FIG. 3 shows a structure of a radio frame of an NR, based on an embodiment of the present disclosure.

FIG. 3 shows a structure of a radio frame of an NR, based on an embodiment of the present disclosure. The embodiment of FIG. 3 may be combined with various embodiments of the present disclosure.

Referring to FIG. 3, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15 * $2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15 * $2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 4:
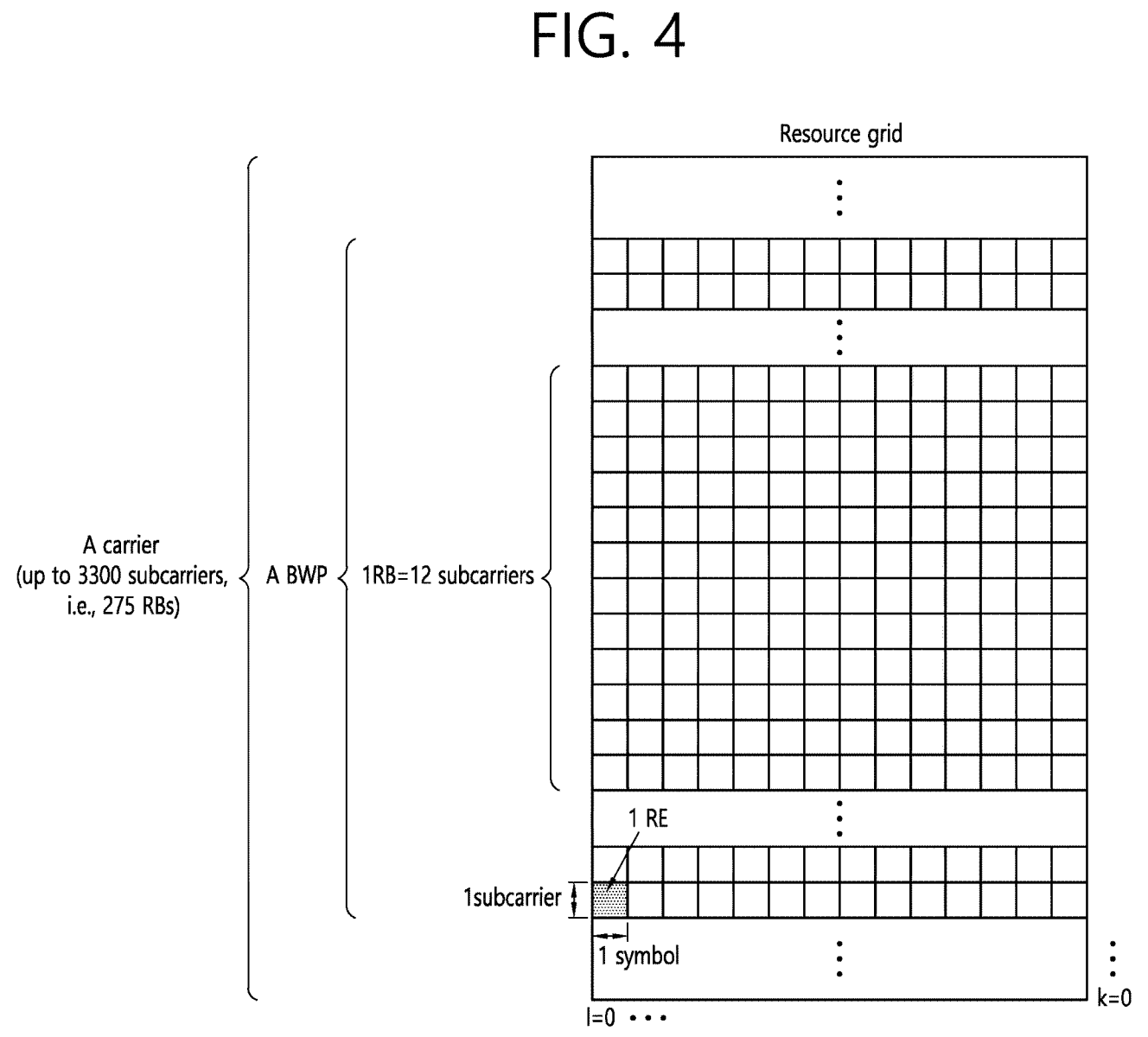

FIG. 4 shows a structure of a slot of an NR frame, based on an embodiment of the present disclosure. The embodiment of FIG. 4 may be combined with various embodiments of the present disclosure.

Referring to FIG. 4, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORE-SET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit a SL channel or a SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 5:
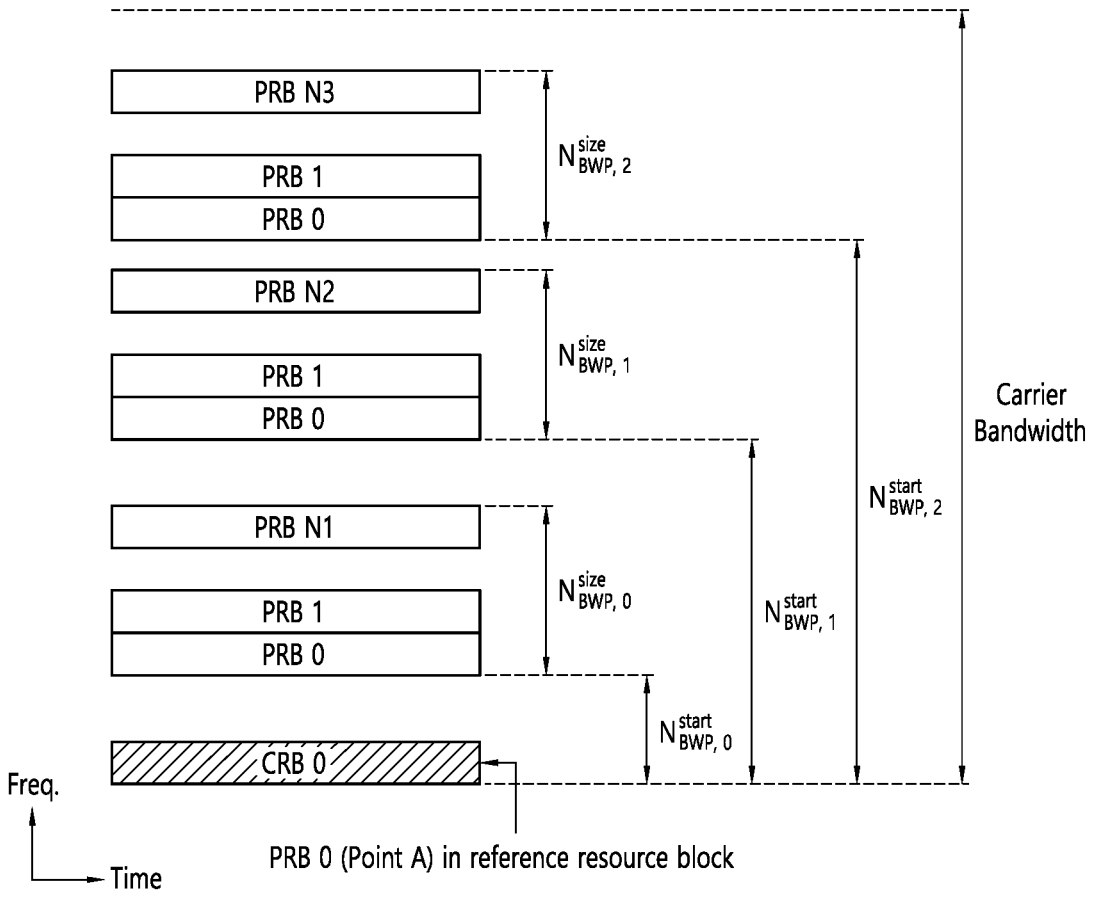
FIG. 5 shows an example of a BWP, based on an embodiment of the present disclosure.

FIG. 5 shows an example of a BWP, based on an embodiment of the present disclosure. The embodiment of FIG. 5 may be combined with various embodiments of the present disclosure. It is assumed in the embodiment of FIG. 5 that the number of BWPs is 3.

Referring to FIG. 5, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as a SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 6:
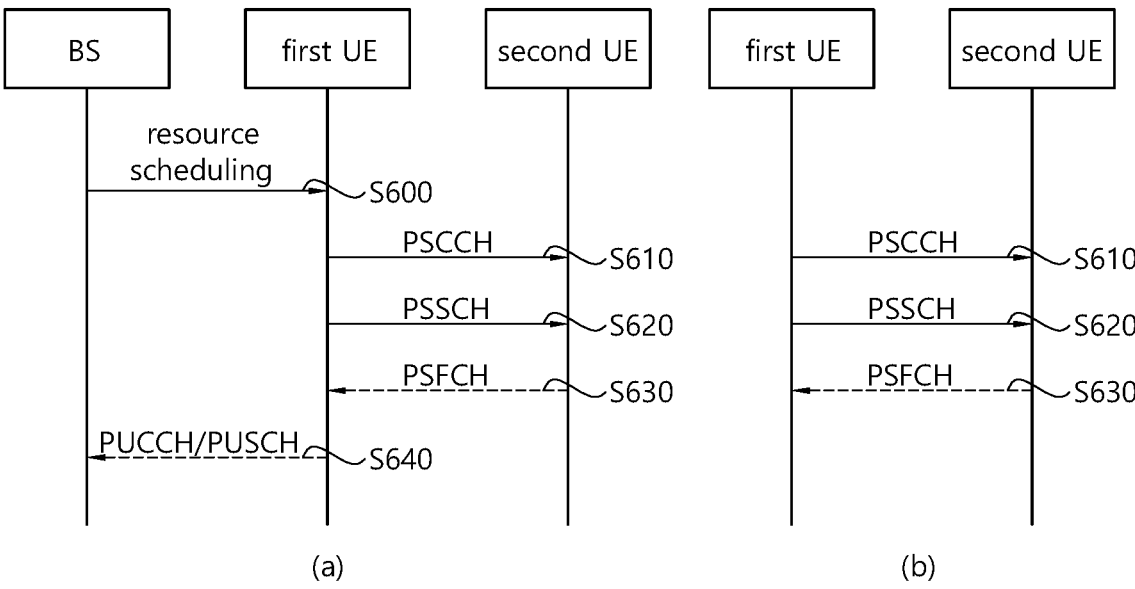
FIG. 6 shows a procedure of performing V2X or SL communication by a UE based on a transmission mode, based on an embodiment of the present disclosure.

FIG. 6 shows a procedure of performing V2X or SL communication by a UE based on a transmission mode, based on an embodiment of the present disclosure. The embodiment of FIG. 6 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 6 shows a UE operation related to an LTE transmission mode 1 or an LTE transmission mode 3. Alternatively, for example, (a) of FIG. 6 shows a UE operation related to an NR resource allocation mode 1. For example, the LTE transmission mode 1 may be applied to general SL communication, and the LTE transmission mode 3 may be applied to V2X communication.

For example, (b) of FIG. 6 shows a UE operation related to an LTE transmission mode 2 or an LTE transmission mode 4. Alternatively, for example, (b) of FIG. 6 shows a UE operation related to an NR resource allocation mode 2.

Referring to (a) of FIG. 6, in the LTE transmission mode 1, the LTE transmission mode 3, or the NR resource allocation mode 1, a base station may schedule SL resource(s) to be used by a UE for SL transmission. For example, in step S600, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s)

configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource(s) to the first UE, and the base station may transmit a DCI related to activation or release of the CG resource(s) to the first UE.

In step S610, the first UE may transmit a PSCCH (e.g., sidelink control information (SCI) or 1$^{st}$-stage SCI) to a second UE based on the resource scheduling. In step S620, the first UE may transmit a PSSCH (e.g., 2$^{nd}$-stage SCI, MAC PDU, data, etc.) related to the PSCCH to the second UE. In step S630, the first UE may receive a PSFCH related to the PSCCH/PSSCH from the second UE. For example, HARQ feedback information (e.g., NACK information or ACK information) may be received from the second UE through the PSFCH. In step S640, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1.

Referring to (b) of FIG. 6, in the LTE transmission mode 2, the LTE transmission mode 4, or the NR resource allocation mode 2, a UE may determine SL transmission resource(s) within SL resource(s) configured by a base station/network or pre-configured SL resource(s). For example, the configured SL resource(s) or the pre-configured SL resource(s) may be a resource pool. For example, the UE may autonomously select or schedule resource(s) for SL transmission. For example, the UE may perform SL communication by autonomously selecting resource(s) within the configured resource pool. For example, the UE may autonomously select resource(s) within a selection window by performing a sensing procedure and a resource (re)selection procedure. For example, the sensing may be performed in a unit of subchannel(s). For example, in step S610, a first UE which has selected resource(s) from a resource pool by itself may transmit a PSCCH (e.g., sidelink control information (SCI) or 1$^{st}$-stage SCI) to a second UE by using the resource(s). In step S620, the first UE may transmit a PSSCH (e.g., 2$^{nd}$-stage SCI, MAC PDU, data, etc.) related to the PSCCH to the second UE. In step S630, the first UE may receive a PSFCH related to the PSCCH/PSSCH from the second UE.

Referring to (a) or (b) of FIG. 6, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a 1$^{st}$ SCI, a first SCI, a 1$^{st}$-stage SCI or a 1$^{st}$-stage SCI format, and a SCI transmitted through a PSSCH may be referred to as a 2$^{nd}$ SCI, a second SCI, a 2$^{nd}$-stage SCI or a 2$^{nd}$-stage SCI format. For example, the $1^{st}$-stage SCI format may include a SCI format 1-A, and the $2^{nd}$-stage SCI format may include a SCI format 2-A and/or a SCI format 2-B.

Hereinafter, an example of SCI format 1-A will be described.

SCI format 1-A is used for the scheduling of PSSCH and 2nd-stage-SCI on PSSCH.

The following information is transmitted by means of the SCI format 1-A:

Priority—3 bits

Frequency resource assignment—ceiling ($\log_2$ ($N^{SL}_{subChannel}(N^{SL}_{subChannel}+1)/2)$) bits when the value of the higher layer parameter sl-MaxNumPerReserve is configured to 2; otherwise ceiling $\log_2(N^{SL}_{subChannel}$ ($N^{SL}_{subChannel}+1)(2N^{SL}_{subChannel}+1)/6)$ bits when the value of the higher layer parameter sl-MaxNumPerReserve is configured to 3

Time resource assignment—5 bits when the value of the higher layer parameter sl-MaxNumPerReserve is configured to 2; otherwise 9 bits when the value of the higher layer parameter sl-MaxNumPerReserve is configured to 3

Resource reservation period—ceiling ($\log_2 N_{rsv\_period}$) bits, where $N_{rsv\_period}$ is the number of entries in the higher layer parameter sl-ResourceReservePeriodList, if higher layer parameter sl-MultiReserveResource is configured; 0 bit otherwise DMRS pattern—ceiling ($\log_2 N_{pattern}$) bits, where $N_{pattern}$ is the number of DMRS patterns configured by higher layer parameter sl-PSSCH-DMRS-TimePatternList $2^{nd}$ stage SCI format—2 bits as defined in Table 5

Beta_offset indicator—2 bits as provided by higher layer parameter sl-BetaOffsets2ndSCI Number of DMRS port—1 bit as defined in Table 6

Modulation and coding scheme—5 bits

Additional MCS table indicator—1 bit if one MCS table is configured by higher layer parameter sl-Additional-MCS-Table; 2 bits if two MCS tables are configured by higher layer parameter sl-Additional-MCS-Table; 0 bit otherwise PSFCH overhead indication—1 bit if higher layer parameter sl-PSFCH-Period=2 or 4; 0 bit otherwise Reserved—a number of bits as determined by higher layer parameter sl-NumReservedBits, with value set to zero.

TABLE 5

| Value of 2nd-stage SCI format field | 2nd-stage SCI format |
|---|---|
| 00 | SCI format 2-A |
| 01 | SCI format 2-B |
| 10 | Reserved |
| 11 | Reserved |

TABLE 6

| Value of the Number of DMRS port field | Antenna ports |
|---|---|
| 0 | 1000 |
| 1 | 1000 and 1001 |

Hereinafter, an example of SCI format 2-A will be described.

SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:

HARQ process number—4 bits

New data indicator—1 bit

Redundancy version—2 bits

Source ID—8 bits

Destination ID—16 bits

HARQ feedback enabled/disabled indicator—1 bit

Cast type indicator—2 bits as defined in Table 7

CSI request—1 bit

TABLE 7

| Value of Cast type indicator | Cast type |
|---|---|
| 00 | Broadcast |
| 01 | Groupcast when HARQ-ACK information includes ACK or NACK |
| 10 | Unicast |
| 11 | Groupcast when HARQ-ACK information includes only NACK |

Hereinafter, an example of SCI format 2-B will be described.

SCI format 2-B is used for the decoding of PSSCH, with HARQ operation when HARQ-ACK information includes only NACK, or when there is no feedback of HARQ-ACK information.

The following information is transmitted by means of the SCI format 2-B:

HARQ process number—4 bits

New data indicator—1 bit

Redundancy version—2 bits

Source ID—8 bits

Destination ID—16 bits

HARQ feedback enabled/disabled indicator—1 bit

Zone ID—12 bits

Communication range requirement—4 bits determined by higher layer parameter sl-ZoneConfigMCR-Index Referring to (a) or (b) of FIG. 6, in step S630, the first UE may receive the PSFCH. For example, the first UE and the second UE may determine a PSFCH resource, and the second UE may transmit HARQ feedback to the first UE using the PSFCH resource.

Referring to (a) of FIG. 6, in step S640, the first UE may transmit SL HARQ feedback to the base station through the PUCCH and/or the PUSCH.

Figure 7:
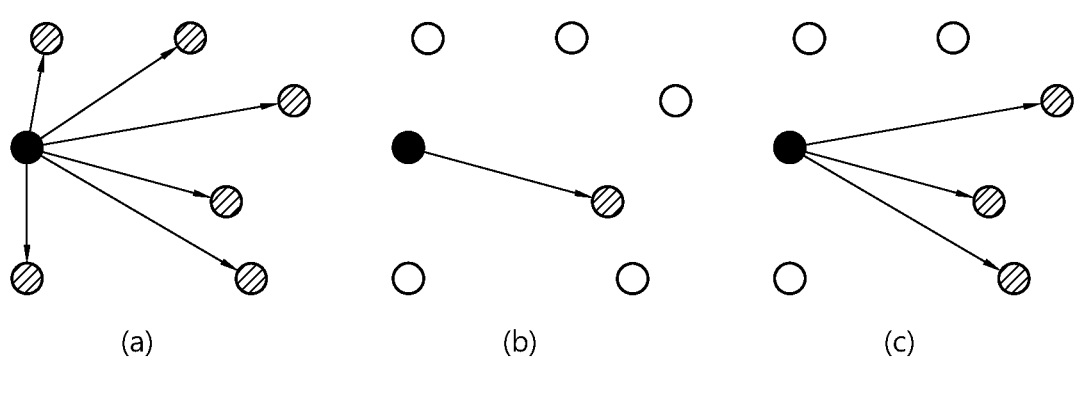
FIG. 7 shows three cast types, based on an embodiment of the present disclosure.

FIG. 7 shows three cast types, based on an embodiment of the present disclosure. The embodiment of FIG. 7 may be combined with various embodiments of the present disclosure. Specifically, FIG. 7(a) shows a broadcast type of SL communication, FIG. 7(b) shows a unicast type of SL communication, and FIG. 7(c) shows a groupcast type of SL communication. In the case of unicast type SL communication, a UE may perform one-to-one communication with other UEs. In the case of groupcast type SL communication, a UE may perform SL communication with one or more UEs in a group to which it belongs. In various embodiments of the present disclosure, SL groupcast communication may be replaced by SL multicast communication, SL one-to-many communication, and the like.

In this specification, the wording "configuration or definition" may be interpreted as being configured (in advance) by a base station or network (e.g., through predefined signaling (e.g., SIB signaling, MAC signaling, RRC signaling). For example, "A may be configured" may include "a base station or network (pre)configures/defines or informs the UE of A". Alternatively, the wording "configuration or definition" may be interpreted as being configured or defined in advance by the system. For example, "A may be config-ured" may include "A is configured/defined in advance by the system".

Referring to the standard document, some procedures and technical specifications related to this disclosure are shown in below.

TABLE 8]

| 3GPP TS 38.321 V16.2.1 |
| --- |

The MAC entity may be configured by RRC with a DRX functionality that controls the UE's PDCCH monitoring activity for the MAC entity's C-RNTI, CI-RNTI, CS-RNTI, INT-RNTI, SFI-RNTI, SP-CSI-RNTI, TPC-PUCCH-RNTI, TPC-PUSCH-RNTI, TPC-SRS-RNTI, and AI-RNTI. When using DRX operation, the MAC entity shall also monitor PDCCH according to requirements found in other clauses of this specification. When in RRC CONNECTED, if DRX is configured, for all the activated Serving Cells, the MAC entity may monitor the PDCCH discontinuously using the DRX operation specified in this clause; otherwise the MAC entity shall monitor the PDCCH as specified in TS 38.213 [6].
    NOTE 1:   If Sidelink resource allocation mode 1 is configured by RRC, a DRX functionality is not configured.
RRC controls DRX operation by configuring the following parameters:
  - drx-onDurationTimer: the duration at the beginning of a DRX cycle;
  - drx-SlotOffset: the delay before starting the drx-onDurationTimer;
  - drx-InactivityTimer: the duration after the PDCCH occasion in which a PDCCH indicates a new UL or DL transmission for the MAC entity;
  - drx-RetransmissionTimerDL (per DL HARQ process except for the broadcast process): the maximum duration until a DL retransmission is received;
  - drx-RetransmissionTimerUL (per UL HARQ process): the maximum duration until a grant for UL retransmission is received;
  - drx-LongCycleStartOffset: the Long DRX cycle and drx-StartOffset which defines the subframe where the Long and Short DRX cycle starts;
  - drx-ShortCycle (optional): the Short DRX cycle;
  - drx-ShortCycleTimer (optional): the duration the UE shall follow the Short DRX cycle;
  - drx-HARQ-RTT-TimerDL (per DL HARQ process except for the broadcast process): the minimum duration before a DL assignment for HARQ retransmission is expected by the MAC entity;
  - drx-HARQ-RTT-TimerUL (per UL HARQ process): the minimum duration before a UL HARQ retransmission grant is expected by the MAC entity;
  - ps-Wakeup (optional): the configuration to start associated drx-onDurationTimer in case DCP is monitored but not detected;
  - ps-TransmitOtherPeriodicCSI (optional): the configuration to report periodic CSI that is not L1-RSRP on PUCCH during the time duration indicated by drx-onDurationTimer in case DCP is configured but associated drx-onDurationTimer is not started;
  - ps-TransmitPeriodicL1-RSRP (optional): the configuration to transmit periodic CSI that is L1-RSRP on PUCCH during the time duration indicated by drx-onDurationTimer in case DCP is configured but associated drx-onDurationTimer is not started.

TABLE 9

Serving Cells of a MAC entity may be configured by RRC in two DRX groups with separate DRX parameters. When RRC does not configure a secondary DRX group, there is only one DRX group and all Serving Cells belong to that one DRX group. When two DRX groups are configured, each Serving Cell is uniquely assigned to either of the two groups. The DRX parameters that are separately configured for each DRX group are: drx-onDurationTimer, drx-InactivityTimer. The DRX parameters that are common to the DRX groups are: drx-SlotOffset, drx-RetransmissionTimerDL, drx-RetransmissionTimerUL, drx-LongCycleStartOffset, drx-ShortCycle (optional), drx-ShortCycleTimer (optional), drx-HARQ-RTT-TimerDL, and drx-HARQ-RTT-TimerUL.
When a DRX cycle is configured, the Active Time for Serving Cells in a DRX group includes the time while:
  - drx-onDurationTimer or drx-InactivityTimer configured for the DRX group is running; or
  - drx-RetransmissionTimerDL or drx-RetransmissionTimerUL is running on any Serving Cell in the DRX group; or
  - ra-ContentionResolutionTimer (as described in clause 5.1.5) or msgB-ResponseWindow (as described in clause 5.1.4a) is running; or
  - a Scheduling Request is sent on PUCCH and is pending (as described in clause 5.4.4); or
  - a PDCCH indicating a new transmission addressed to the C-RNTI of the MAC entity has not been received after successful reception of a Random Access Response for the Random Access Preamble not selected by the MAC entity among the contention-based Random Access Preamble (as described in clauses 5.1.4 and 5.1.4a).

TABLE 9-continued

When DRX is configured, the MAC entity shall:
  1>if a MAC PDU is received in a configured downlink assignment:
    2>start the drx-HARQ-RTT-TimerDL for the corresponding HARQ process in the
      first symbol after the end of the corresponding transmission carrying the DL
      HARQ feedback;
    2>stop the drx-RetransmissionTimerDL for the corresponding HARQ process.
  1>if a MAC PDU is transmitted in a configured uplink grant and LBT failure
    indication is not received from lower layers:
    2>start the drx-HARQ-RTT-TimerUL for the corresponding HARQ process in the
      first symbol after the end of the first repetition of the corresponding PUSCH
      transmission;
    2>stop the drx-RetransmissionTimerUL for the corresponding HARQ process.
  1>if a drx-HARQ-RTT-TimerDL expires:
    2>if the data of the corresponding HARQ process was not successfully decoded:
      3>start the drx-RetransmissionTimerDL for the corresponding HARQ process in
        the first symbol after the expiry of drx-HARQ-RTT-TimerDL.
  1>if a drx-HARQ-RTT-TimerUL expires:
    2>start the drx-RetransmissionTimerUL for the corresponding HARQ process in the
      first symbol after the expiry of drx-HARQ-RTT-TimerUL.
  1>if a DRX Command MAC CE or a Long DRX Command MAC CE is received:
    2>stop drx-onDurationTimer for each DRX group;
    2>stop drx-InactivityTimer for each DRX group.
  1>if drx-InactivityTimer for a DRX group expires:
    2>if the Short DRX cycle is configured:
      3>start or restart drx-ShortCycleTimer for this DRX group in the first symbol
        after the expiry of drx-InactivityTimer;
      3>use the Short DRX cycle for this DRX group.
    2>else:
      3>use the Long DRX cycle for this DRX group.

TABLE 10

1>if a DRX Command MAC CE is received:
    2>if the Short DRX cycle is configured:
      3>start or restart drx-ShortCycleTimer for each DRX group in the
        first symbol after the end of DRX Command MAC CE reception;
      3>use the Short DRX cycle for each DRX group.
    2>else:
      3>use the Long DRX cycle for each DRX group.
  1>if drx-ShortCycleTimer for a DRX group expires:
    2>use the Long DRX cycle for this DRX group.
  1>if a Long DRX Command MAC CE is received:
    2>stop drx-ShortCycleTimer for each DRX group;
    2>use the Long DRX cycle for each DRX group.
  1>if the Short DRX cycle is used for a DRX group, and [(SFN × 10) +
    subframe number] modulo (drx-ShortCycle) = (drx-StartOffset)
    modulo (drx-ShortCycle):
    2>start drx-onDurationTimer for this DRX group after drx-SlotOffset
      from the beginning of the subframe.
  1>if the Long DRX cycle is used for a DRX group, and [(SFN × 10) +
    subframe number] modulo (drx-LongCycle) = drx-StartOffset.
    2>if DCP monitoring is configured for the active DL BWP as specified
      in TS 38.213 [6], clause 10.3:
      3>if DCP indication associated with the current DRX cycle received
        from lower layer indicated to start drx-onDurationTimer, as
        specified in TS 38.213 [6]; or
      3>if all DCP occasion(s) in time domain, as specified in TS 38.213
        [6], associated with the current DRX cycle occurred in Active
        Time considering grants/assignments/DRX Command MAC CE/
        Long DRX Command MAC CE received and Scheduling Request
        sent until 4 ms prior to start of the last DCP occasion, or within
        BWP switching interruption length, or during a measurement
        gap, or when the MAC entity monitors for a PDCCH transmission
        on the search space indicated by recoverySearchSpaceId of the
        SpCell identified by the C-RNTI while the ra-ResponseWindow
        is running (as specified in clause 5.1.4); or
      3>if ps-Wakeup is configured with value true and DCP indication
        associated with the current DRX cycle has not been received
        from lower layers:
        4>start drx-onDurationTimer after drx-SlotOffset from the
          beginning of the subframe.
    2>else:
      3>start drx-onDurationTimer for this DRX group after drx-SlotOffset
        from the beginning of the subframe.
NOTE 2:   In case of unaligned SFN across carriers in a cell group, the
        SFN of the SpCell is used to calculate the DRX duration.

TABLE 11

1>if a DRX group is in Active Time:
    2>monitor the PDCCH on the Serving Cells in this DRX group as
      specified in TS 38.213 [6];
    2>if the PDCCH indicates a DL transmission:
      3>start the drx-HARQ-RTT-TimerDL for the corresponding HARQ
        process in the first symbol after the end of the corresponding
        transmission carrying the DL HARQ feedback;
NOTE 3:   When HARQ feedback is postponed by PDSCH-to-HARQ_
        feedback timing indicating a non-numerical k1 value, as specified
        in TS 38.213 [6], the corresponding transmission opportunity to
        send the DL HARQ feedback is indicated in a later PDCCH
        requesting the HARQ-ACK feedback.
      3>stop the drx-RetransmissionTimerDL for the corresponding
        HARQ process.
      3>if the PDSCH-to-HARQ_feedback timing indicate a non-
        numerical k1 value as specified in TS 38.213 [6]:
        4>start the drx-RetransmissionTimerDL in the first symbol after
          the PDSCH transmission for the corresponding HARQ process.
    2>if the PDCCH indicates a UL transmission:
      3>start the drx-HARQ-RTT-TimerUL for the corresponding HARQ
        process in the first symbol after the end of the first repetition of the
        corresponding PUSCH transmission;
      3>stop the drx-RetransmissionTimerUL for the corresponding
        HARQ process.
    2>if the PDCCH indicates a new transmission (DL or UL) on a Serving
      Cell in this DRX group:
      3>start or restart drx-InactivityTimer for this DRX group in the first
        symbol after the end of the PDCCH reception.
    2>if a HARQ process receives downlink feedback information and
      acknowledgement is indicated:
      3>stop the drx-RetransmissionTimerUL for the corresponding
        HARQ process.
  1>if DCP monitoring is configured for the active DL BWP as specified
    in TS 38.213 [6], clause 10.3; and
  1>if the current symbol n occurs within drx-onDurationTimer duration;
  and
  1>if drx-onDurationTimer associated with the current DRX cycle is not
    started as specified in this clause:
    2>if the MAC entity would not be in Active Time considering
      grants/assignments/DRX Command MAC CE/Long DRX Command
      MAC CE received and Scheduling Request sent until 4 ms prior to TABLE 11-continued symbol n when evaluating all DRX Active Time conditions as
specified in this clause:
  3>not transmit periodic SRS and semi-persistent SRS defined in
  TS 38.214 [7];
  3>not report semi-persistent CSI configured on PUSCH;
  3>if ps-TransmitPeriodicL1-RSRP is not configured with value true:
    4>not report periodic CSI that is L1-RSRP on PUCCH.
  3>if ps-TransmitOtherPeriodicCSI is not configured with value true:
    4>not report periodic CSI that is not L1-RSRP on PUCCH.
1>else:
  2>in current symbol n, if a DRX group would not be in Active Time
  considering grants/assignments scheduled on Serving Cell(s) in this
  DRX group and DRX Command MAC CE/Long DRX Command
  MAC CE received and Scheduling Request sent until 4 ms prior to
  symbol n when evaluating all DRX Active Time conditions as
  specified in this clause:
    3>not transmit periodic SRS and semi-persistent SRS defined in
    TS 38.214 [7] in this DRX group;
    3>not report CSI on PUCCH and semi-persistent CSI configured on
    PUSCH in this DRX group.
  2>if CSI masking (csi-Mask) is setup by upper layers:
    3>in current symbol n, if drx-onDurationTimer of a DRX group
    would not be running considering grants/assignments scheduled
    on Serving Cell(s) in this DRX group and DRX Command MAC
    CE/Long DRX Command MAC CE received until 4 ms prior to
    symbol n when evaluating all DRX Active Time conditions as
    specified in this clause; and
    4>not report CSI on PUCCH in this DRX group.

TABLE 12

NOTE 4: If a UE multiplexes a CSI configured on PUCCH with other overlapping
        UCI(s) according to the procedure specified in TS 38.213 [6] clause 9.2.5
        and this CSI multiplexed with other UCI(s) would be reported on a PUCCH
        resource outside DRX Active Time of the DRX group in which this PUCCH
        is configured, it is up to UE implementation whether to report this CSI
        multiplexed with other UCI(s).
Regardless of whether the MAC entity is monitoring PDCCH or not on the Serving
Cells in a DRX group, the MAC entity transmits HARQ feedback, aperiodic CSI on
PUSCH, and aperiodic SRS defined in TS 38.214 [7] on the Serving Cells in the DRX
group when such is expected.
The MAC entity needs not to monitor the PDCCH if it is not a complete PDCCH
occasion (e.g. the Active Time starts or ends in the middle of a PDCCH occasion).

Meanwhile, in Release 17 new radio (NR) vehicle to everything (V2X), sidelink (SL) discontinuous reception (DRX) operation is supported. In addition, SL DRX inactivity timer operation in SL groupcast will be supported. In the embodiment(s) of the present disclosure, a method of operating an SL DRX inactivity timer linked to a groupcast SL transmission and/or SL reception is proposed. In the following description, "when, if, in case of" may be replaced with "based on".

Proposal: a method for an SL DRX inactivity timer operation in SL groupcast/broadcast According to one embodiment of the present disclosure, a method for an SL DRX inactivity timer operation in SL groupcast/broadcast is proposed.

For example, in SL groupcast/broadcast, an SL DRX inactivity timer may operate per groupcast/broadcast L2 destination ID. For example, a groupcast/broadcast destination L2 ID may be a destination L2 ID generated based on a groupcast/broadcast service generated at a V2X layer. Further, for example, a transmitting UE and a receiving UE may operate their respective SL DRX inactivity timers per groupcast/broadcast destination L2 ID. For example, a transmitting UE may (re)start an SL DRX inactivity timer when transmitting a new TB of groupcast/broadcast, and a receiving UE may (re)start an SL DRX inactivity timer when receiving the new TB of groupcast/broadcast. That is, for example, a transmitting UE may transmit a new TB during the extended active time (when an inactivity timer is running), and a receiving UE may receive the new TB during the extended active time (when an inactivity timer is running).

For example, if an SL DRX inactivity timer in a group-cast/broadcast operates per groupcast/broadcast destination L2 ID, the following behavior proposed in this disclosure may be possible.

According to one embodiment of the present disclosure, when a transmitting UE transmits a new groupcast/broadcast TB, it may extend an active time by (re)starting an SL DRX inactivity timer. Furthermore, for example, when a receiving UE receives the new groupcast/broadcast TB transmitted by the transmitting UE, the receiving UE may extend its (own) active time by the amount extended by the transmitting UE by (re)starting an SL DRX inactivity timer.

For example, if an SL DRX inactivity timer in groupcast/broadcast is operated per groupcast/broadcast destination L2 ID, a receiving UE may utilize (the receiving UE's own) active time interval (i.e., during which the SL DRX inactivity timer is running) extended to receive a new groupcast/broadcast TB transmitted by a transmitting UE as an interval during which it (the receiving UE) can transmit anew groupcast/broadcast TB as another transmitting UE, by stealing the interval. In addition, for example, a transmitting UE may utilize (the transmitting UE's own) active time interval (i.e., during which the SL DRX inactivity timer is running) extended by transmitting a new groupcast/broadcast TB to a receiving UE as an interval during which it (the transmitting UE) can receive a new groupcast/broadcast TB as another receiving UE, by stealing the interval.

According to one embodiment of the present disclosure, a receiving UE may utilize (the receiving UE's own) active time interval (i.e., during which the SL DRX inactivity timer is running) extended to receive a new groupcast/broadcast TB transmitted by a transmitting UE as an interval in which it (the receiving UE) can transmit a new groupcast/broadcast TB as another transmitting UE, by stealing the interval. Wherein, for example, the new TB transmitted in the stolen interval may have the same destination L2 ID as the destination L2 ID of the TB related to the restart of the SL DRX inactivity timer, but may also have a different destination L2 ID from the destination L2 ID of the TB related to the restart of the SL DRX inactivity timer. For example, the stolen interval may be an interval which the receiving UE stole to perform the transmission of a new TB as another transmitting UE, from within the SL DRX inactivity timer interval extended by the receiving UE to monitor the reception of a new TB.

Further, for example, a transmitting UE may utilize (the transmitting UE's own) active time interval (i.e., during which the SL DRX inactivity timer is running) extended by transmitting a new groupcast/broadcast TB to a receiving UE, by stealing the interval, as an interval during which it (the transmitting UE) can receive a groupcast/broadcast new TB as another receiving UE. Wherein, for example, the transmitting UE may receive a new TB having the same destination L2 ID as the destination L2 ID of the TB related to the restart of the SL DRX inactivity timer in the stolen interval, but may also receive a new TB having a different destination L2 ID from the destination L2 ID of the TB related to the restart of the SL DRX inactivity timer (during which the SL DRX inactivity timer restarted to transmit a new TB is running). For example, the stolen interval may be an interval which the transmitting UE stole to receive different groupcast/broadcast data as another receiving UE from within the SL DRX inactivity timer interval extended by the transmitting UE to transmit a new TB.

Figure 8:
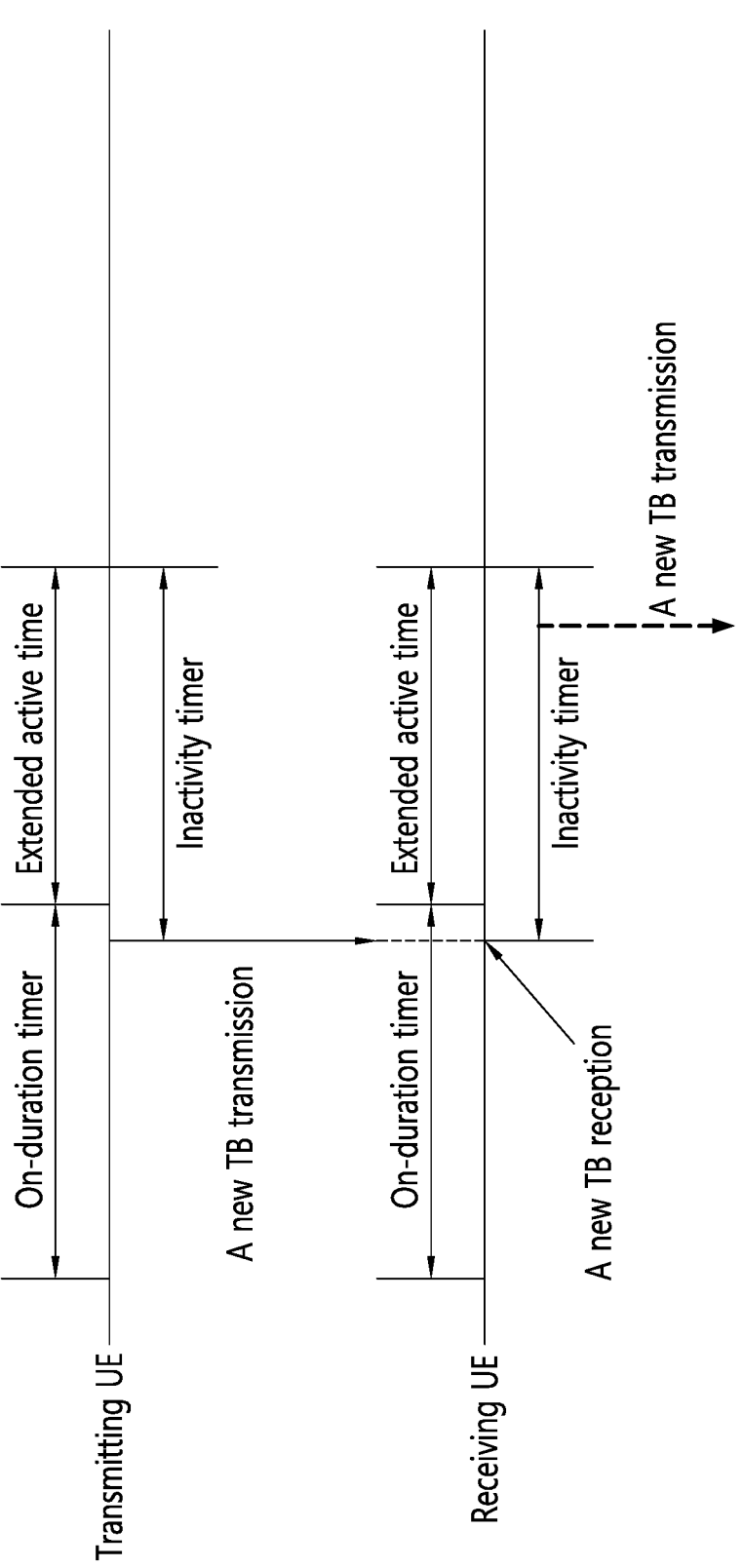
FIG. 8 shows an operation performed by a UE performing a groupcast based on the SL DRX inactivity timer, according to one embodiment of the present disclosure.

FIG. 8 shows an operation performed by a UE performing a groupcast based on the SL DRX inactivity timer, according to one embodiment of the present disclosure. The embodiment of FIG. 8 may be combined with various embodiments of the present disclosure.

Referring to FIG. 8, an embodiment which represents the proposal of the present disclosure is shown. For example, a receiving UE may receive a new groupcast/broadcast TB from a transmitting UE and further monitor whether there is a new TB to be transmitted by the transmitting UE by extending its active time by the running time of an SL DRX inactivity timer. For example, according to the proposed method of the present disclosure, if a receiving UE has a new groupcast/broadcast TB to transmit, it may steal a part of the extended active time interval (the interval for further monitoring for a new TB to be received) and transmit a new TB. Here, for example, the new TB that the receiving UE transmits after stealing a part of the extended active time interval may have the same destination L2 ID as the TB received from the transmitting UE, or may have a different destination L2 ID from the TB received from the transmitting UE.

For example, the operation of the present disclosure may be a solution that can be extended/applied to SL broadcast (or, unicast) operation.

The SL DRX configuration referred to in this disclosure may include at least one or more of the following parameters.

TABLE 13

Sidelink DRX configurations

✓ SL drx-onDurationTimer: the duration at the beginning of a SL DRX Cycle;
✓ SL drx-SlotOffset: the delay before starting the sl drx-onDuration Timer;
✓ SL drx-Inactivity Timer: the duration after the PSCCH occasion in which a PSCCH indicates a new SL transmission for the MAC entity;
✓ SL drx-StartOffset: the subframe where the SL DRX cycle start;
✓ SL drx-Cycle: the SL DRX cycle;
✓ SL drx-HARQ-RTT-Timer (per HARQ process or per sidelink process): the minimum duration before an assignment for HARQ retransmission is expected by the MAC entity.
✓ SL drx-RetransmissionTimer (per HARQ process or per sidelink process): the maximum duration until a retransmission is received.

The following SL DRX timers mentioned in this disclosure may be used for the following purposes.

SL DRX on-duration timer: Indicates the period of time during which a UE performing SL DRX operation should operate as the default active time to receive PSCCH/PSSCH from other UE.

SL DRX inactivity timer: may represent an interval that extends an SL DRX on-duration interval, which is an interval during which a UE performing SL DRX operation must operate as active time by default to receive PSCCH/PSSCH from other UE. That is, an SL DRX on-duration timer may be extended by the SL DRX inactivity timer interval. Furthermore, when a UE receives a PSCCH for a new TB (first SCI and/or second SCI) or a new packet (new PSSCH transmission) from other UE, the UE may extend the SL DRX on-duration timer by starting an SL DRX inactivity timer.

SL DRX HARQ RTT timer: may indicate an interval during which a UE performing SL DRX operation may operate in sleep mode until it receives a retransmission packet (or PSSCH assignment) from other UE. That is, if a UE starts the SL DRX HARQ RTT timer, the UE may determine that other UE will not transmit a sidelink retransmission packet to it until the SL DRX HARQ RTT timer expires and may operate in sleep mode during that timer. Or, the UE may not perform monitoring of an SL channel/signal which the counterpart UE transmits, until the expiration of an SL DRX HARQ RTT timer.

SL DRX retransmission timer: may indicate an interval of time during which a UE performing SL DRX operation is active time to receive retransmission packets (or PSSCH assignments) transmitted by other UE. For example, when an SL DRX HARQ RTT timer expires, an SL DRX retransmission timer may start. During this timer period, a UE may monitor a reception of retransmission sidelink packets (or PSSCH allocations) transmitted by other UE.

For example, the Uu DRX timer below referenced in this disclosure may be used for the following purposes.

drx-HARQ-RTT-TimerSL timer: may indicate an interval where a transmitting UE (UE supporting Uu DRX operation) performing SL communication based on SL resource allocation mode 1 does not perform monitoring for PDCCH (or, DCI) for SL mode 1 resource allocation from a base station.

drx-RetransmissionTimerSL timer: may indicate an interval where a transmitting UE (UE supporting Uu DRX operation) performing SL communication based on SL resource allocation mode 1 performs monitoring for PDCCH (or, DCI) for SL mode 1 resource allocation from a base station.

In addition, in the following description, the names of the timers (SL DRX On-Duration Timer, SL DRX Inactivity timer, SL HARQ RTT Timer, SL DRX Retransmission Timer, etc.) are exemplary, and timers that perform the same/similar functions based on what is described in each timer can be considered the same/similar timer regardless of the name.

The proposal in this disclosure is a solution that may also be applied and extended to address the problem of loss due to interruption in Uu bandwidth part (BWP) switching.

Furthermore, the proposal of the present disclosure is a solution that may also be applied and extended to address the problem of loss due to interruption caused by SL BWP switching, for example, when a UE supports SL multiple BWP.

The proposals in this disclosure may be extended to parameters (and timers) included in default/common SL DRX configurations or default/common SL DRX patterns or default/common SL DRX configurations, as well as parameters (and timers) included in UE pair specific SL DRX configurations or UE pair specific SL DRX patterns or UE pair specific SL DRX configurations.

Furthermore, for example, an on-duration term referred to in the present disclosure may be extended to an active time interval, and an off-duration term may be extended to a sleep time interval. For example, an active time may refer to a period of time when a UE is operating in a wake up state (RF module is on) to receive/transmit radio signals. For example, sleep time may refer to an interval during which a UE operates in a sleep mode state (RF module is off) to conserve power. For example, a sleep period does not imply that a transmitting UE is obligated to operate in sleep mode, i.e., the UE may be allowed to operate in active time for a short period of time to perform a sensing operation/transmission operation if necessary, even during a sleep period.

Further, for example, whether (some of) the proposed schemes/rules of this disclosure apply and/or the related parameters (e.g., thresholds) may be configured specifically (or differently or independently) depending on the resource pool, congestion level, service priority (and/or type), QoS requirements (e.g., latency, reliability) or PQI, traffic type (e.g., (aperiodic) generation), SL transport resource allocation mode (Mode 1, Mode 2), a Tx profile (e.g., a TX profile indicating that it is a service where an SL DRX operation is supported, a Tx profile indicating that it is a service where an SL DRX operation is not needed to be supported), etc.

For example, whether to apply the proposals of the present disclosure (and/or related parameter configuration value) may be configured specifically (and/or, independently and/or differently) for at least one of a resource pool (e.g., a resource pool where a PSFCH is configured, a resource pool where a PSFCH is not configured), service/packet type (and/or priority), QoS profile or QoS requirement (e.g., URLLC/EMBB traffic, reliability, latency), PQI, PFI, cast type (e.g., unicast, groupcast, broadcast), (resource pool) congestion level (e.g., CBR), SL HARQ feedback mode (e.g., NACK only feedback, ACK/NACK feedback), a HARQ feedback enabled MAC PDU (and/or a HARQ feedback disabled MAC PDU) transmission case, whether PUCCH based SL HARQ feedback reporting operation is configured, a case where pre-emption (and/or re-evaluation) (or, -based resource reselection) is (not) performed, (L2 or L1) (source and/or destination) ID, (L2 or L1) (a combination of a source layer ID and a destination layer ID) identifier, (L2 or L1) (a combination of a pair of a source layer ID and a destination layer ID, and a cast type) identifier, a direction of a pair of a source layer ID and a destination layer ID, PC5 RRC connection/link, a case where an SL DRX is (not) performed (or, supported), SL mode type (resource allocation mode 1, resource allocation mode 2), a case where (a)periodic resource reservation is performed, a Tx profile (e.g., a TX profile indicating that it is a service where an SL DRX operation is supported, a Tx profile indicating that it is a service where an SL DRX operation is not needed to be supported).

For example, the term active time as used in the present disclosure may refer to a predefined amount of time for a UE to receive sidelink signaling or sidelink data from another UE, or a period of time, or a specific timer (SL DRX retransmission timer, SL DRX inactivity timer, or a timer to ensure a receiving UE to operate as an active time in DRX operation) time, during which a UE is active.

Further, for example, whether the proposals and proposed rules in this disclosure apply (and/or the associated parameter configuration values) may also apply to mmWave SL operation.

According to the prior art, when a UE performing groupcast communication starts a timer related to an SL DRX active time based on SL reception, if no other UE performs SL transmission in the active time interval extended by the timer related to the SL DRX active time being started, the power saving effect may be reduced because the active time is maintained even though no SL communication is performed in the extended active time interval.

According to an embodiment of the present disclosure, since a UE that has extended the timer related to the SL DRX active time based on receiving operation in the extended active time interval may perform SL transmission operation, the active time interval that passes without SL communication being performed may be reduced, thereby improving the power saving effect.

FIG. 9 shows a procedure for a first device to perform wireless communication, according to one embodiment of the present disclosure. The embodiment of FIG. 9 may be combined with various embodiments of the present disclosure.

Referring to FIG. 9, in step S910, a first device may obtain a sidelink (SL) discontinuous reception (DRX) configuration including information related to a timer for active time, based on a first destination layer (L) 2 ID. In step S920, the first device may receive, from a second device in a group where groupcast communication is performed, first SCI for scheduling of a first physical sidelink shared channel (PSSCH) through a first physical sidelink control channel (PSCCH), based on an active time of the SL DRX configuration. In step S930, the first device may receive, from the second device, a first medium access control (MAC) protocol data unit (PDU) related to the first destination L2 ID and second SCI through the first PSSCH, based on the active time. In step S940, the first device may start the timer for active time, based on the reception of the second SCI. In step S950, the first device may transmit, to at least one device in a group, third SCI for scheduling of a second PSSCH through a second PSCCH, based on the timer for active time being running. In step S960, the first device may transmit, to the at least one device, a second MAC PDU related to a second destination L2 ID through the second PSSCH, based on the timer for active time being running. For example, the active time may include a time interval during which the timer for active time is running.

For example, the first destination L2 ID may be different from the second destination L2 ID.

For example, the first destination L2 ID may be the same as the second destination L2 ID.

For example, starting the timer for active time may include: obtaining a first destination L1 ID based on the second SCI; comparing the first destination L1 ID with 16 least significant bit (LSB) of an intended destination L2 ID of the first device; and starting the timer for active time, based on the first destination L1 ID and 16 LSB of the intended destination L2 ID being the same.

For example, at least one SL DRX configuration including the SL DRX configuration may be configured per destination L2 ID.

For example, the first device may be included in the group.

For example, the first destination L2 ID and the second destination L2 ID may be generated by a higher layer.

For example, the higher layer may be a vehicle to everything (V2X) layer.

For example, the third SCI and the second MAC PDU may be transmitted based on an SL DRX inactivity timer of the SL DRX configuration being running.

For example, the third SCI and the second MAC PDU being transmitted based on an on-duration timer of the SL DRX configuration being running may be not allowed.

For example, the timer for active time may include at least one of an SL DRX on-duration timer, an SL DRX inactivity timer, or an SL DRX retransmission timer.

For example, the first destination L2 ID may be related to a first SL groupcast service, and the second destination L2 ID may be related to a second SL groupcast service.

For example, the first destination L2 ID may be related to a first PC5 5G QoS indicator (PQI), and the second destination L2 ID may be related to a second PQI.

The embodiments described above may be applied to various devices described below. For example, a processor 102 of a first device 100 may obtain a sidelink (SL) discontinuous reception (DRX) configuration including information related to a timer for active time, based on a first destination layer (L) 2 ID. And, the processor 102 of the first device 100 may control a transceiver 106 to receive, from a second device 200 in a group where groupcast communication is performed, first SCI for scheduling of a first physical sidelink shared channel (PSSCH) through a first physical sidelink control channel (PSCCH), based on an active time of the SL DRX configuration. And, the processor 102 of the first device 100 may control the transceiver 106 to receive, from the second device 200, a first medium access control (MAC) protocol data unit (PDU) related to the first destination L2 ID and second SCI through the first PSSCH, based on the active time. And, the processor 102 of the first device 100 may start the timer for active time, based on the reception of the second SCI. And, the processor 102 of the first device 100 may control the transceiver 106 to transmit, to at least one device in a group, third SCI for scheduling of a second PSSCH through a second PSCCH, based on the timer for active time being running. And, the processor 102 of the first device 100 may control the transceiver 106 to transmit, to the at least one device, a second MAC PDU related to a second destination L2 ID through the second PSSCH, based on the timer for active time being running. For example, the active time may include a time interval during which the timer for active time is running.

According to an embodiment of the present disclosure, a first device for performing wireless communication may be performed. For example, the first device may comprise: one or more memories storing instructions; one or more transceivers; and one or more processors connected to the one or more memories and the one or more transceivers. For example, the one or more processors may execute the instructions to: obtain a sidelink (SL) discontinuous reception (DRX) configuration including information related to a timer for active time, based on a first destination layer (L) 2 ID; receive, from a second device in a group where groupcast communication is performed, first SCI for scheduling of a first physical sidelink shared channel (PSSCH) through a first physical sidelink control channel (PSCCH), based on an active time of the SL DRX configuration; receive, from the second device, a first medium access control (MAC) protocol data unit (PDU) related to the first destination L2 ID and second SCI through the first PSSCH, based on the active time; start the timer for active time, based on the reception of the second SCI; transmit, to at least one device in a group, third SCI for scheduling of a second PSSCH through a second PSCCH, based on the timer for active time being running; and transmit, to the at least one device, a second MAC PDU related to a second destination L2 ID through the second PSSCH, based on the timer for active time being running, wherein the active time may include a time interval during which the timer for active time is running.

For example, the first destination L2 ID may be different from the second destination L2 ID.

For example, the first destination L2 ID may be the same as the second destination L2 ID.

For example, starting the timer for active time may include: obtaining a first destination L1 ID based on the second SCI; comparing the first destination L1 ID with 16 least significant bit (LSB) of an intended destination L2 ID of the first device; and starting the timer for active time, based on the first destination L1 ID and 16 LSB of the intended destination L2 ID being the same.

For example, at least one SL DRX configuration including the SL DRX configuration may be configured per destination L2 ID.

For example, the first device may be included in the group.

For example, the first destination L2 ID and the second destination L2 ID may be generated by a higher layer.

For example, the higher layer may be a vehicle to everything (V2X) layer.

For example, the third SCI and the second MAC PDU may be transmitted based on an SL DRX inactivity timer of the SL DRX configuration being running.

For example, the third SCI and the second MAC PDU being transmitted based on an on-duration timer of the SL DRX configuration being running may be not allowed.

For example, the timer for active time may include at least one of an SL DRX on-duration timer, an SL DRX inactivity timer, or an SL DRX retransmission timer.

For example, the first destination L2 ID may be related to a first SL groupcast service, and the second destination L2 ID may be related to a second SL groupcast service.

For example, the first destination L2 ID may be related to a first PC5 5G QoS indicator (PQI), and the second destination L2 ID may be related to a second PQI.

According to an embodiment of the present disclosure, a device adapted to control a first user equipment (UE) may be proposed. For example, the device may comprise: one or more processors; and one or more memories operably connectable to the one or more processors and storing instructions. For example, the one or more processors may execute the instructions to: obtain a sidelink (SL) discontinuous reception (DRX) configuration including information related to a timer for active time, based on a first destination layer (L) 2 ID; receive, from a second UE in a group where groupcast communication is performed, first SCI for scheduling of a first physical sidelink shared channel (PSSCH) through a first physical sidelink control channel (PSCCH), based on an active time of the SL DRX configuration; receive, from the second UE, a first medium access control (MAC) protocol data unit (PDU) related to the first destination L2 ID and second SCI through the first PSSCH, based on the active time; start the timer for active time, based on the reception of the second SCI; transmit, to at least one UE in a group, third SCI for scheduling of a second PSSCH through a second PSCCH, based on the timer for active time being running; and transmit, to the at least one UE, a second MAC PDU related to a second destination L2 ID through the second PSSCH, based on the timer for active time being running, wherein the active time may include a time interval during which the timer for active time is running.

According to an embodiment of the present disclosure, a non-transitory computer-readable storage medium storing instructions may be proposed. For example, the instructions, when executed, may cause a first device to: obtain a sidelink (SL) discontinuous reception (DRX) configuration including information related to a timer for active time, based on a first destination layer (L) 2 ID; receive, from a second device in a group where groupcast communication is performed, first SCI for scheduling of a first physical sidelink shared channel (PSSCH) through a first physical sidelink control channel (PSCCH), based on an active time of the SL DRX configuration; receive, from the second device, a first medium access control (MAC) protocol data unit (PDU) related to the first destination L2 ID and second SCI through the first PSSCH, based on the active time; start the timer for active time, based on the reception of the second SCI; transmit, to at least one device in a group, third SCI for scheduling of a second PSSCH through a second PSCCH, based on the timer for active time being running; and transmit, to the at least one device, a second MAC PDU related to a second destination L2 ID through the second PSSCH, based on the timer for active time being running, wherein the active time may include a time interval during which the timer for active time is running.

FIG. 10 shows a procedure for a second device to perform wireless communication, according to one embodiment of the present disclosure. The embodiment of FIG. 10 may be combined with various embodiments of the present disclosure.

Referring to FIG. 10, in step S1010, a second device may obtain a sidelink (SL) discontinuous reception (DRX) configuration including information related to a timer for active time, based on a first destination layer (L) 2 ID. In step S1020, the second device may transmit, to a first device in a group where groupcast communication is performed, first SCI for scheduling of a first physical sidelink shared channel (PSSCH) through first physical sidelink control channel (PSCCH). In step S1030, the second device may transmit, to the first device, a first medium access control (MAC) protocol data unit (PDU) related to the first destination L2 ID and second SCI through the first PSSCH, based on the active time. In step S1040, the second device may start the timer for active time, based on the transmission of the second SCI. In step S1050, the second device may receive, from at least one device in a group, third SCI for scheduling of a second PSSCH through a second PSCCH, based on the timer for active time being running. In step S1060, the second device may receive, from the at least one device, a second MAC PDU related to a second destination L2 ID through the second PSSCH, based on the timer for active time being running. For example, the active time may include a time interval during which the timer for active time is running.

For example, the first destination L2 ID may be different from the second destination L2 ID.

The embodiments described above may be applied to various devices described below. For example, a processor 202 of a second device 200 may obtain a sidelink (SL) discontinuous reception (DRX) configuration including information related to a timer for active time, based on a first destination layer (L) 2 ID. And, the processor 202 of the second device 200 may control a transceiver 206 to transmit, to a first device 100 in a group where groupcast communication is performed, first SCI for scheduling of a first physical sidelink shared channel (PSSCH) through first physical sidelink control channel (PSCCH). And, the processor 202 of the second device 200 may control the transceiver 206 to transmit, to the first device 100, a first medium access control (MAC) protocol data unit (PDU) related to the first destination L2 ID and second SCI through the first PSSCH, based on the active time. And, the processor 202 of the second device 200 may start the timer for active time, based on the transmission of the second SCI. And, the processor 202 of the second device 200 may control the transceiver 206 to receive, from at least one device in a group, third SCI for scheduling of a second PSSCH through a second PSCCH, based on the timer for active time being running. And, the processor 202 of the second device 200 may control the transceiver 206 to receive, from the at least one device, a second MAC PDU related to a second destination L2 ID through the second PSSCH, based on the timer for active time being running. For example, the active time may include a time interval during which the timer for active time is running.

According to an embodiment of the present disclosure, a second device for performing wireless communication may be proposed. For example, the second device may comprise: one or more memories storing instructions; one or more transceivers; and one or more processors connected to the one or more memories and the one or more transceivers. For example, the one or more processors may execute the instructions to: obtain a sidelink (SL) discontinuous reception (DRX) configuration including information related to a timer for active time, based on a first destination layer (L) 2 ID; transmit, to a first device in a group where groupcast communication is performed, first SCI for scheduling of a first physical sidelink shared channel (PSSCH) through first physical sidelink control channel (PSCCH); transmit, to the first device, a first medium access control (MAC) protocol data unit (PDU) related to the first destination L2 ID and second SCI through the first PSSCH, based on the active time; start the timer for active time, based on the transmission of the second SCI; receive, from at least one device in a group, third SCI for scheduling of a second PSSCH through a second PSCCH, based on the timer for active time being running; and receive, from the at least one device, a second MAC PDU related to a second destination L2 ID through the second PSSCH, based on the timer for active time being running, wherein the active time may include a time interval during which the timer for active time is running.

For example, the first destination L2 ID may be different from the second destination L2 ID.

Various embodiments of the present disclosure may be combined with each other.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 11:
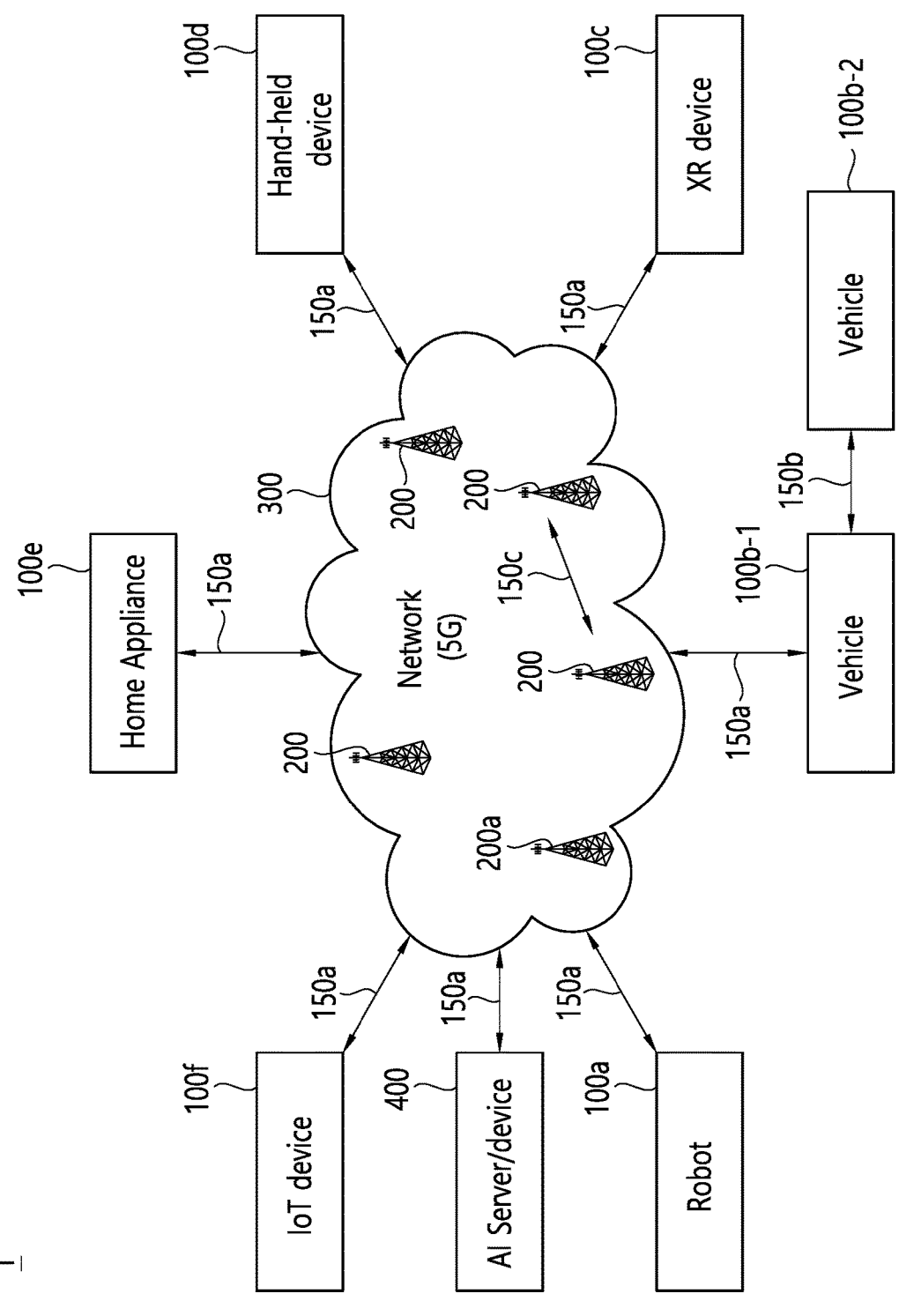
FIG. 11 shows a communication system 1, based on an embodiment of the present disclosure.

FIG. 11 shows a communication system 1, based on an embodiment of the present disclosure. The embodiment of FIG. 11 may be combined with various embodiments of the present disclosure.

Referring to FIG. 11, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT)

device 100_f_, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200_a_ may operate as a BS/network node with respect to other wireless devices.

Here, the wireless communication technologies implemented in the wireless devices 100_a_-100_f_ of the present disclosure may include LTE, NR, and 6G, as well as Narrowband Internet of Things for low power communication. In this case, for example, NB-IoT technology may be an example of Low Power Wide Area Network (LPWAN) technology, and may be implemented in specifications such as LTE Cat NB1 and/or LTE Cat NB2, and is not limited to the above names. Additionally or alternatively, the wireless communication technology implemented in the wireless devices 100_a_-100_f_ of this specification may perform communication based on LTE-M technology. In one example, LTE-M technology may be an example of LPWAN technology and may be referred to by various names, such as enhanced Machine Type Communication (eMTC). For example, LTE-M technology may be implemented as at least one of various specifications, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above names. Additionally or alternatively, the wireless communication technology implemented in the wireless devices 100_a_-100_f_ of this disclosure may include at least one of ZigBee, Bluetooth, and Low Power Wide Area Network (LPWAN), with consideration for low power communication, and is not limited to the above names. For example, ZigBee technology can create personal area networks (PANs) for small, low-power digital communications based on various specifications, such as IEEE 802.15.4, and may be referred to by various names.

The wireless devices 100_a_ to 100_f_ may be connected to the network 300 via the BSs 200. An AI technology may be applied to the wireless devices 100_a_ to 100_f_ and the wireless devices 100_a_ to 100_f_ may be connected to the AI server 400 via the network 300. The network 300 may be configured using a 3G network, a 4G (e.g., LTE) network, or a 5G (e.g., NR) network. Although the wireless devices 100_a_ to 100_f_ may communicate with each other through the BSs 200/network 300, the wireless devices 100_a_ to 100_f_ may perform direct communication (e.g., sidelink communication) with each other without passing through the BSs/network. For example, the vehicles 100_b_-1 and 100_b_-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100_a_ to 100_f_.

Wireless communication/connections 150_a_, 150_b_, or 150_c_ may be established between the wireless devices 100_a_ to 100_f_/BS 200, or BS 200/BS 200. Herein, the wireless communication/connections may be established through various RATs (e.g., 5G NR) such as uplink/downlink communication 150_a_, sidelink communication 150_b_ (or, D2D communication), or inter BS communication (e.g. relay, Integrated Access Backhaul (IAB)). The wireless devices and the BSs/the wireless devices may transmit/receive radio signals to/from each other through the wireless communication/connections 150_a_ and 150_b_. For example, the wireless communication/connections 150_a_ and 150_b_ may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 12:
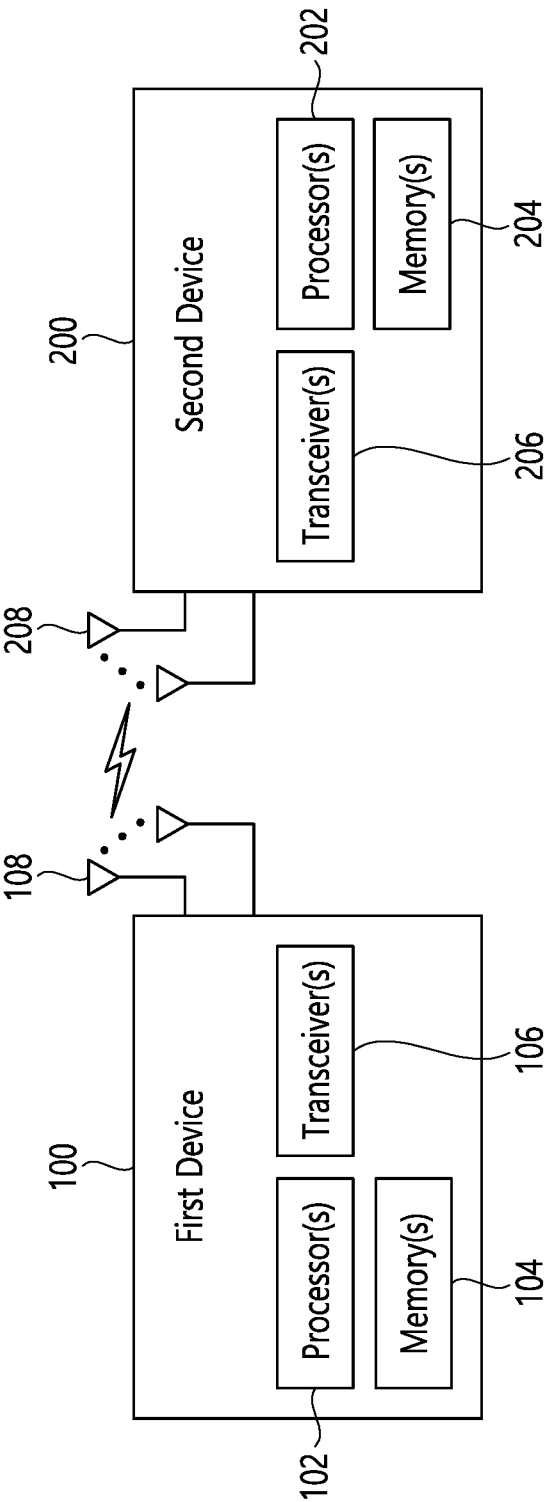
FIG. 12 shows wireless devices, based on an embodiment of the present disclosure.

FIG. 12 shows wireless devices, based on an embodiment of the present disclosure. The embodiment of FIG. 12 may be combined with various embodiments of the present disclosure.

Referring to FIG. 12, a first wireless device 100 and a second wireless device 200 may transmit radio signals through a variety of RATs (e.g., LTE and NR). Herein, {the first wireless device 100 and the second wireless device 200} may correspond to {the wireless device 100_x_ and the BS 200} and/or {the wireless device 100_x_ and the wireless device 100_x_} of FIG. 11.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 13:
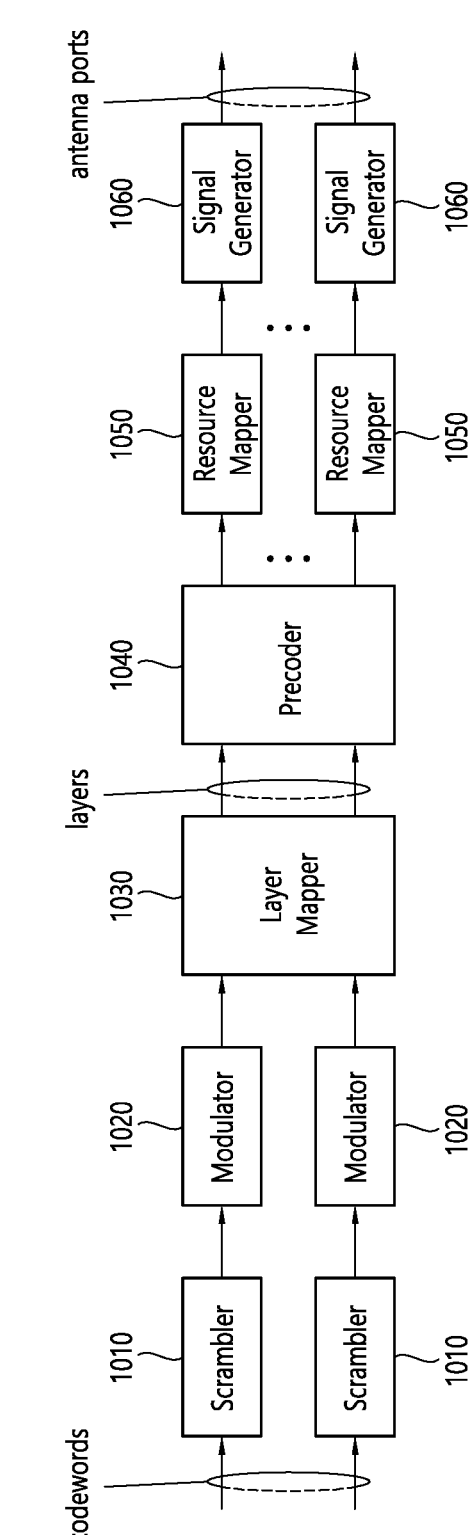
FIG. 13 shows a signal process circuit for a transmission signal, based on an embodiment of the present disclosure.

FIG. 13 shows a signal process circuit for a transmission signal, based on an embodiment of the present disclosure. The embodiment of FIG. 13 may be combined with various embodiments of the present disclosure.

Referring to FIG. 13, a signal processing circuit 1000 may include scramblers 1010, modulators 1020, a layer mapper 1030, a precoder 1040, resource mappers 1050, and signal generators 1060. An operation/function of FIG. 13 may be performed, without being limited to, the processors 102 and 202 and/or the transceivers 106 and 206 of FIG. 12. Hardware elements of FIG. 13 may be implemented by the processors 102 and 202 and/or the transceivers 106 and 206 of FIG. 12. For example, blocks 1010 to 1060 may be implemented by the processors 102 and 202 of FIG. 12. Alternatively, the blocks 1010 to 1050 may be implemented by the processors 102 and 202 of FIG. 12 and the block 1060 may be implemented by the transceivers 106 and 206 of FIG. 12.

Codewords may be converted into radio signals via the signal processing circuit 1000 of FIG. 13. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 13. For example, the wireless devices (e.g., 100 and 200 of FIG. 12) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 14:
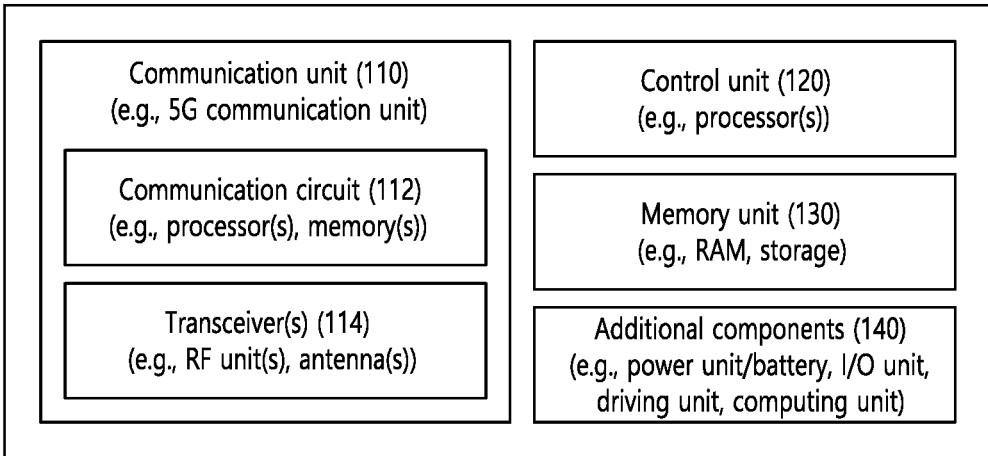
FIG. 14 shows another example of a wireless device, based on an embodiment of the present disclosure.

FIG. 14 shows another example of a wireless device, based on an embodiment of the present disclosure. The wireless device may be implemented in various forms according to a use-case/service (refer to FIG. 11). The embodiment of FIG. 14 may be combined with various embodiments of the present disclosure.

Referring to FIG. 14, wireless devices 100 and 200 may correspond to the wireless devices 100 and 200 of FIG. 12 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 12. For example, the transceiver(s) 114 may include the one or more transceivers 106 and 206 and/or the one or more antennas 108 and 208 of FIG. 12. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 11), the vehicles (100b-1 and 100b-2 of FIG. 11), the XR device (100c of FIG. 11), the hand-held device (100d of FIG. 11), the home appliance (100e of FIG. 11), the IoT device (100f of FIG. 11), a digital broadcast terminal, a hologram device, a public safety device, an MTC device, a medicine device, a fintech device (or a finance device), a security device, a climate/environment device, the AI server/ device (400 of FIG. 11), the BSs (200 of FIG. 11), a network node, etc. The wireless device may be used in a mobile or fixed place according to a use-example/service.

In FIG. 14, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 14 will be described in detail with reference to the drawings.

Figure 15:
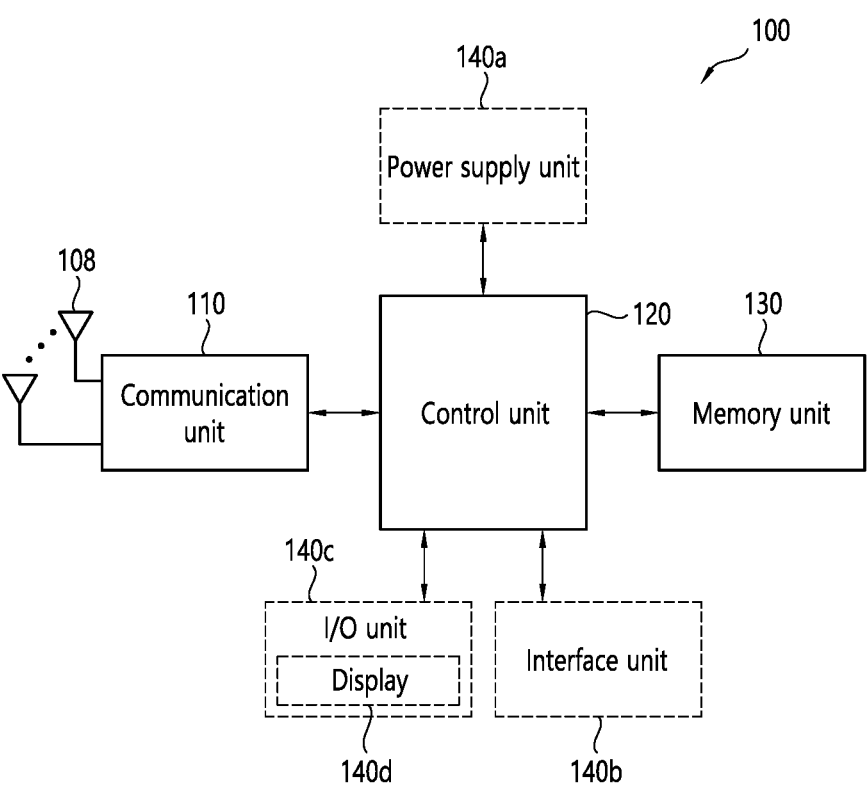
FIG. 15 shows a hand-held device, based on an embodiment of the present disclosure.

FIG. 15 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT). The embodiment of FIG. 15 may be combined with various embodiments of the present disclosure.

Referring to FIG. 15, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 14, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

FIG. 16 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc. The embodiment of FIG. 16 may be combined with various embodiments of the present disclosure.

Referring to FIG. 16, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 14, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing, by a first device, wireless communication, the method comprising:

obtaining a sidelink (SL) discontinuous reception (DRX) configuration including information related to a timer for active time, based on a first destination layer (L) 2 ID;

receiving, from a second device in a group where groupcast communication is performed, first SCI for scheduling of a first physical sidelink shared channel (PSSCH) through a first physical sidelink control channel (PSCCH), based on an active time of the SL DRX configuration;

receiving, from the second device, a first medium access control (MAC) protocol data unit (PDU) related to the first destination L2 ID and second SCI through the first PSSCH, based on the active time;

starting the timer for active time, based on the reception of the second SCI;

transmitting, to at least one device in the group, third SCI for scheduling of a second PSSCH through a second PSCCH, based on the timer for active time being running; and transmitting, to the at least one device, a second MAC PDU related to a second destination L2 ID through the second PSSCH, based on the timer for active time being running, wherein the active time includes a time interval during which the timer for active time is running.

2. The method of claim 1, wherein the first destination L2 ID is different from the second destination L2 ID.

3. The method of claim 1, wherein the first destination L2 ID is the same as the second destination L2 ID.

4. The method of claim 1, wherein starting the timer for active time includes:

obtaining a first destination L1 ID based on the second SCI;

comparing the first destination L1 ID with 16 least significant bit (LSB) of an intended destination L2 ID of the first device; and starting the timer for active time, based on the first destination L1 ID and 16 LSB of the intended destination L2 ID being the same.

5. The method of claim 1, wherein at least one SL DRX configuration including the SL DRX configuration is configured per destination L2 ID.

6. The method of claim 1, wherein the first device is included in the group.

7. The method of claim 1, wherein the first destination L2 ID and the second destination L2 ID are generated by a higher layer.

8. The method of claim 7, wherein the higher layer is a vehicle to everything (V2X) layer.

9. The method of claim 1, wherein the third SCI and the second MAC PDU are transmitted based on an SL DRX inactivity timer of the SL DRX configuration being running.

10. The method of claim 9, wherein the third SCI and the second MAC PDU being transmitted based on an on-duration timer of the SL DRX configuration being running is not allowed.

11. The method of claim 1, wherein the timer for active time includes at least one of an SL DRX on-duration timer, an SL DRX inactivity timer, or an SL DRX retransmission timer.

12. The method of claim 1, wherein the first destination L2 ID is related to a first SL groupcast service, and wherein the second destination L2 ID is related to a second SL groupcast service.

13. The method of claim 1, wherein the first destination L2 ID is related to a first PC5 5G QoS indicator (PQI), and wherein the second destination L2 ID is related to a second PQI.

14. A first device for performing wireless communication, the first device comprising:

one or more memories storing instructions;

one or more transceivers; and one or more processors connected to the one or more memories and the one or more transceivers, wherein the one or more processors execute the instructions to:

obtain a sidelink (SL) discontinuous reception (DRX) configuration including information related to a timer for active time, based on a first destination layer (L) 2 ID;

receive, from a second device in a group where groupcast communication is performed, first SCI for scheduling of a first physical sidelink shared channel (PSSCH) through a first physical sidelink control channel (PSCCH), based on an active time of the SL DRX configuration;

receive, from the second device, a first medium access control (MAC) protocol data unit (PDU) related to the first destination L2 ID and second SCI through the first PSSCH, based on the active time;

start the timer for active time, based on the reception of the second SCI;

transmit, to at least one device in the group, third SCI for scheduling of a second PSSCH through a second PSCCH, based on the timer for active time being running; and transmit, to the at least one device, a second MAC PDU related to a second destination L2 ID through the second PSSCH, based on the timer for active time being running, wherein the active time includes a time interval during which the timer for active time is running.

15. A device adapted to control a first user equipment (UE), the device comprising:

one or more processors; and one or more memories operably connectable to the one or more processors and storing instructions, wherein the one or more processors execute the instructions to:

obtain a sidelink (SL) discontinuous reception (DRX) configuration including information related to a timer for active time, based on a first destination layer (L) 2 ID;

receive, from a second UE in a group where groupcast communication is performed, first SCI for scheduling of a first physical sidelink shared channel (PSSCH) through a first physical sidelink control channel (PSCCH), based on an active time of the SL DRX 5 configuration;

receive, from the second UE, a first medium access control (MAC) protocol data unit (PDU) related to the first destination L2 ID and second SCI through the first PSSCH, based on the active time; 10 start the timer for active time, based on the reception of the second SCI;

transmit, to at least one UE in the group, third SCI for scheduling of a second PSSCH through a second PSCCH, based on the timer for active time being 15 running; and transmit, to the at least one UE, a second MAC PDU related to a second destination L2 ID through the second PSSCH, based on the timer for active time being running, 20 wherein the active time includes a time interval during which the timer for active time is running.

\* \* \* \* \*